United States Patent
Chanda et al.

(10) Patent No.: US 12,466,735 B2
(45) Date of Patent: Nov. 11, 2025

(54) ORGANIC NON-WETTABLE SUPERHYDROPHOBIC FULLERITE FILMS

(71) Applicant: University of Central Florida Research Foundation, Inc., Orlando, FL (US)

(72) Inventors: Debashis Chanda, Orlando, FL (US); Rinku Saran, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 541 days.

(21) Appl. No.: 17/975,051

(22) Filed: Oct. 27, 2022

(65) Prior Publication Data

US 2023/0183069 A1     Jun. 15, 2023

Related U.S. Application Data

(60) Provisional application No. 63/272,260, filed on Oct. 27, 2021.

(51) Int. Cl.
| | |
|---|---|
| *C01B 32/156* | (2017.01) |
| *B82Y 40/00* | (2011.01) |
| *C01B 32/154* | (2017.01) |
| *B82Y 30/00* | (2011.01) |

(52) U.S. Cl.
CPC ......... *C01B 32/156* (2017.08); *C01B 32/154* (2017.08); *B82Y 30/00* (2013.01); *B82Y 40/00* (2013.01)

(58) Field of Classification Search
CPC ..... C01B 32/154; C01B 32/156; B82Y 30/00; B82Y 40/00
See application file for complete search history.

(56) References Cited

PUBLICATIONS

Partheeban, Thamodaran, and Marappan Sathish. "Selective growth of fullerene octahedra and flower-like particles by a liquid-liquid interfacial precipitation method for super-hydrophobic applications." RSC Advances 6.82 (2016): 78791-78794.*
Zheng, Shushu, Meilin Xu, and Xing Lu. "Facile method toward hierarchical fullerene architectures with enhanced hydrophobicity and photoluminescence." ACS applied materials & interfaces 7.36 (2015): 20285-20291.*
Kim, Jungah, et al. "Unique crystallization of fullerenes: fullerene flowers." Scientific Reports 6.1 (2016): 32205.*
Nakanishi, Takashi, et al. "Nanocarbon superhydrophobic surfaces created from fullerene-based hierarchical supramolecular assemblies." Advanced Materials 20.3 (2008): 443-446.*
Lutsko, J.F. How crystals form: A theory of nucleation pathways. Sci. Adv. 2019;5: eeaav 7399, Apr. 5, 2019, 1-8.

(Continued)

*Primary Examiner* — Richard M Rump
(74) *Attorney, Agent, or Firm* — Anton J. Hopen; Michele Lawson; Smith & Hopen, P.A.

(57) ABSTRACT

A method of producing an organic non-wettable superhydrophobic fullerite film is presented. Non-wettable superhydrophobic fullerite films can be easily produced by growing nanofullerites via a sonication coupled crystallization protocol followed by multiple washings to obtain a pellet of nanofullerites. The pellet is aged for at least several weeks to allow for agglomeration into a gel which may then be applied to a substrate as a non-wettable superhydrophobic fullerite film.

11 Claims, 26 Drawing Sheets

(56) References Cited

PUBLICATIONS

Han, F. et al. On demand synthesis of hollow fullerene nanostructures. Nature Communications (2019)10:1548.
Saran, R. et al. Organic Non-Wettable Superhydrophobic Fullerite Films. Adv. Mater. 2021, Article 2102108.
Jishnu, A. et al. Superhydrophobic graphene-based materials with self-cleaning and anticorrosion performance: An appraisal of neoteric advancement and future perspectives. Colloids and Surfaces A 606 (2020) 125395.
Lundin, J.G. et al. Self-Cleaning Photocatalytic Polyurethane Coatings Containing Modified C60 Fullerene Additives. Coatings 2014, 4, 614-629; doi: 10.3390/coatings4030614.
Bakry, R. et al. Medicinal applications of fullerenes. International Journal of Nanomedicine 2007:2(4), 639-649.
Saji, V.S. Carbon nanostructure-based superhydrophobic surfaces and coatings. Nanotechnology Reviews, 2021; 10: 518-571.
Siddiquie, R.Y. Surface Alterations to Impart Antiviral Properties to Combat COVID-19 Transmission. Transactions of the Indian National Academy of Engineering (2020) 5:343-347.
Wei, L. et al. Supramolecular Synthesis of Fullerene/Tetracene Hybrid Flowerlike Microstructures of Nanoplates via the Charge-Transfer Interactions. J. Phys. Chem. C2011, 115, 21629-21634.
Ma, X. et al. Fullerene C60: Surface Energy and Interfacial Interactions in Aqueous Systems. Langmuir 2010, 26 (14), 11886-11893.
Schreiber, R.E. et al. Real-time molecular scale observation of crystal formation. Nature Chemistry, vol. 9, Apr. 2017, 369-373.

\* cited by examiner

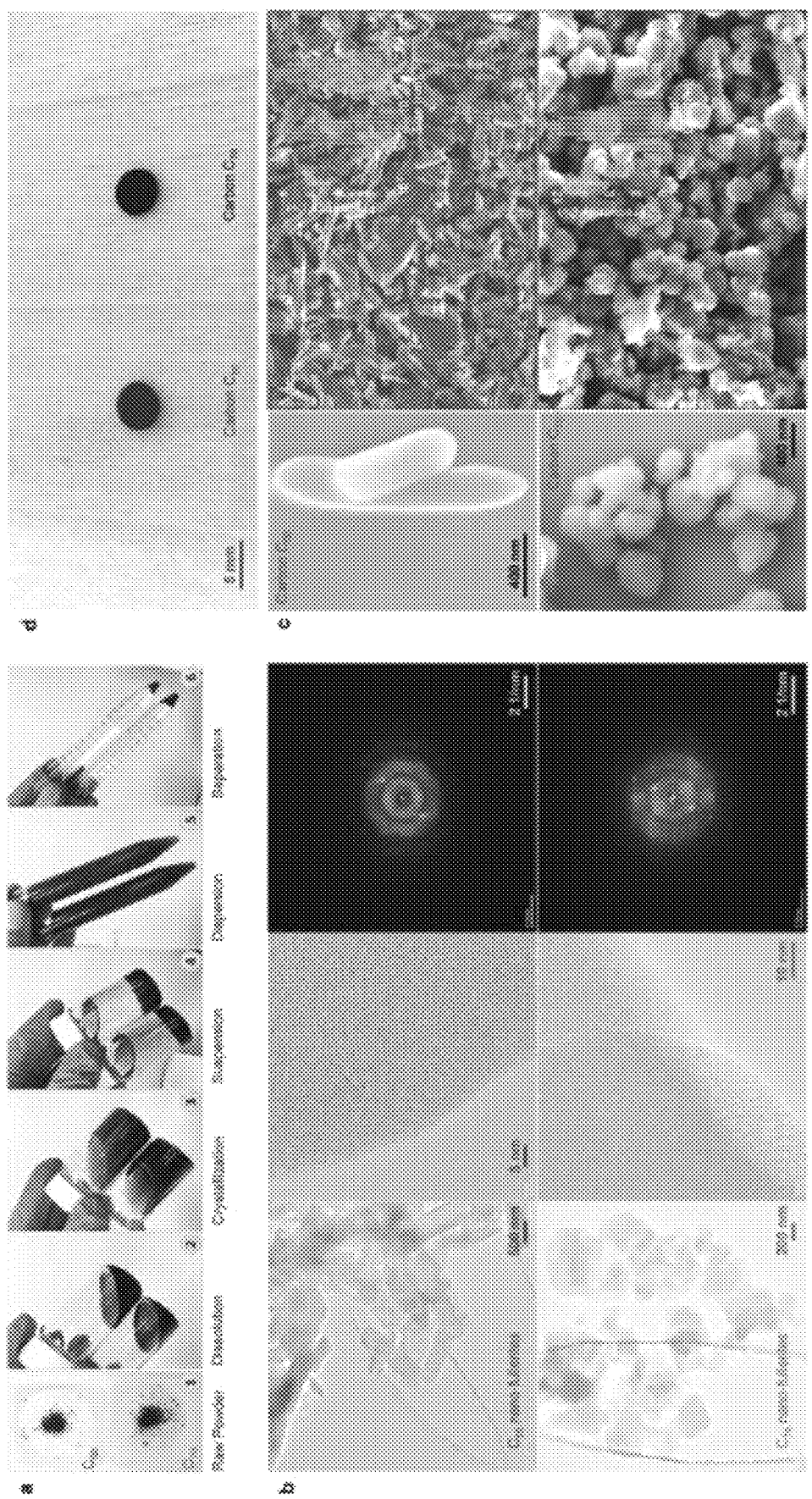
FIG. 1A-D

A
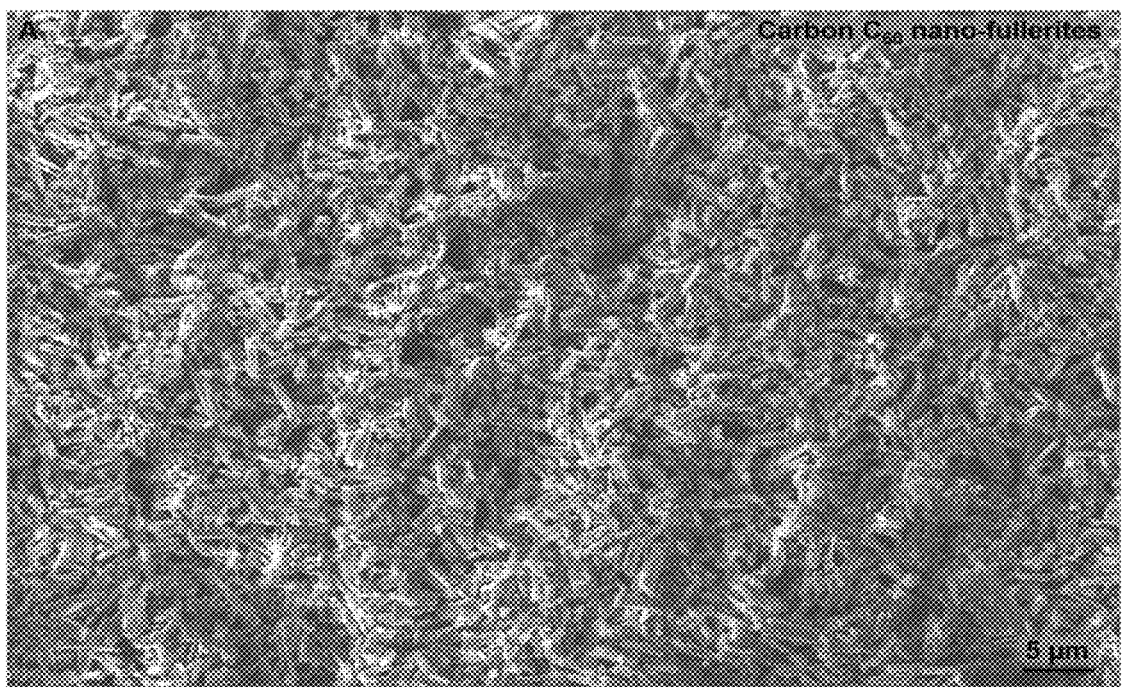
B
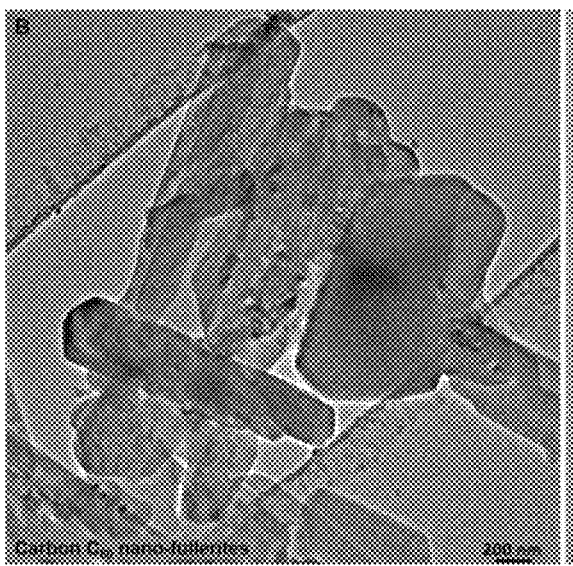
C
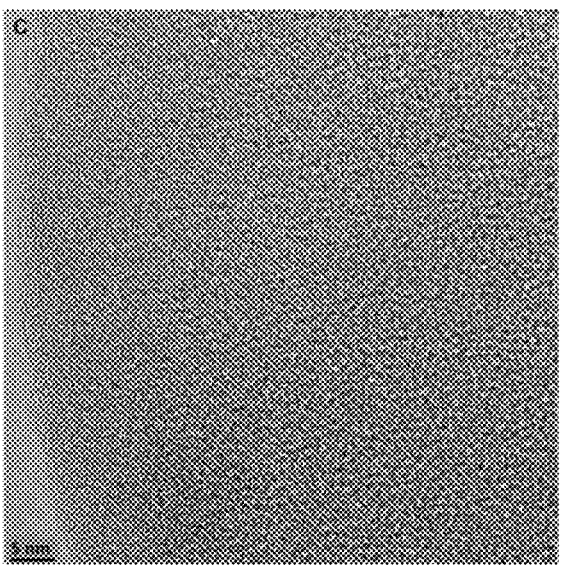
FIG. 2A-C

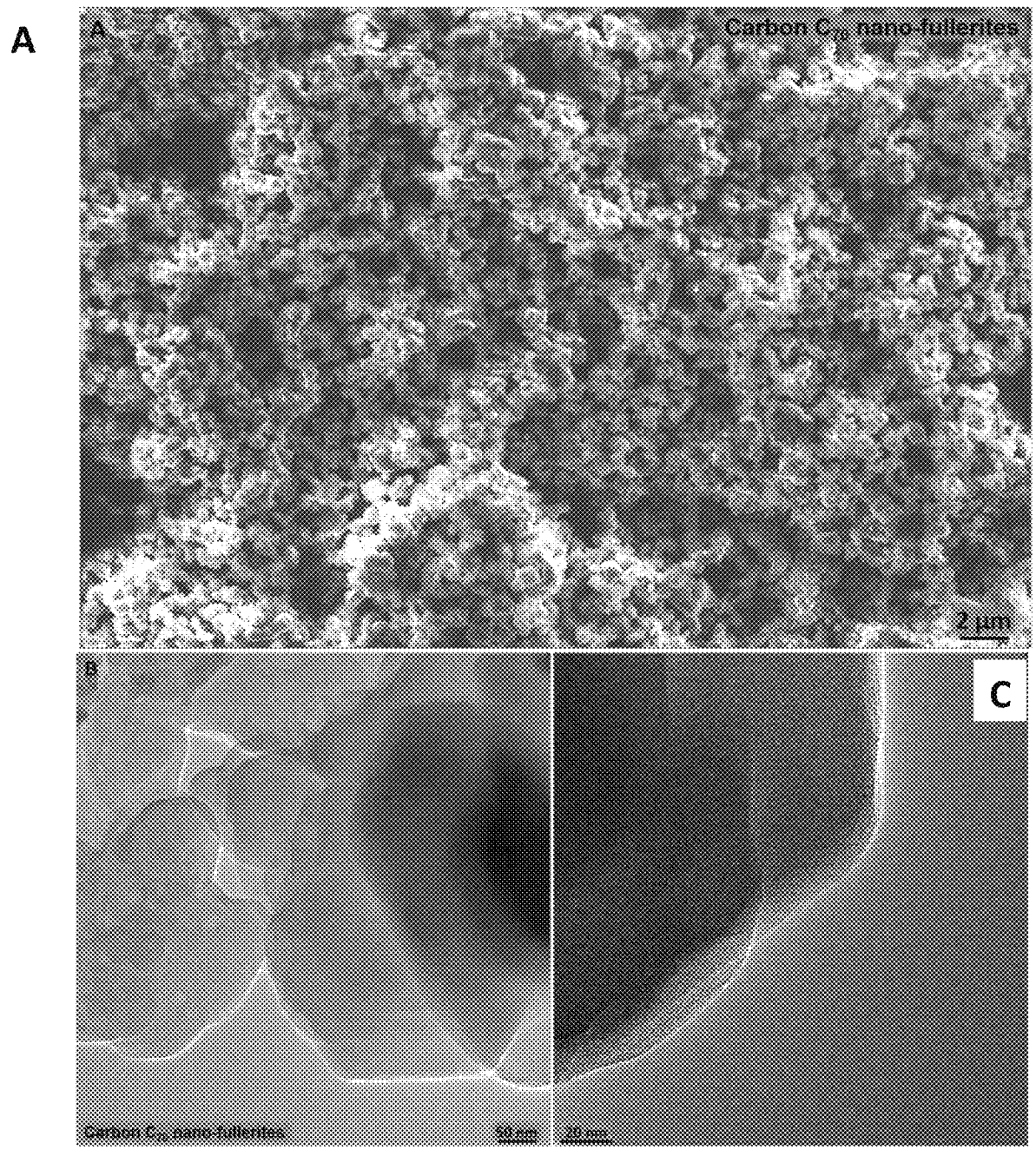
FIG. 3A-C

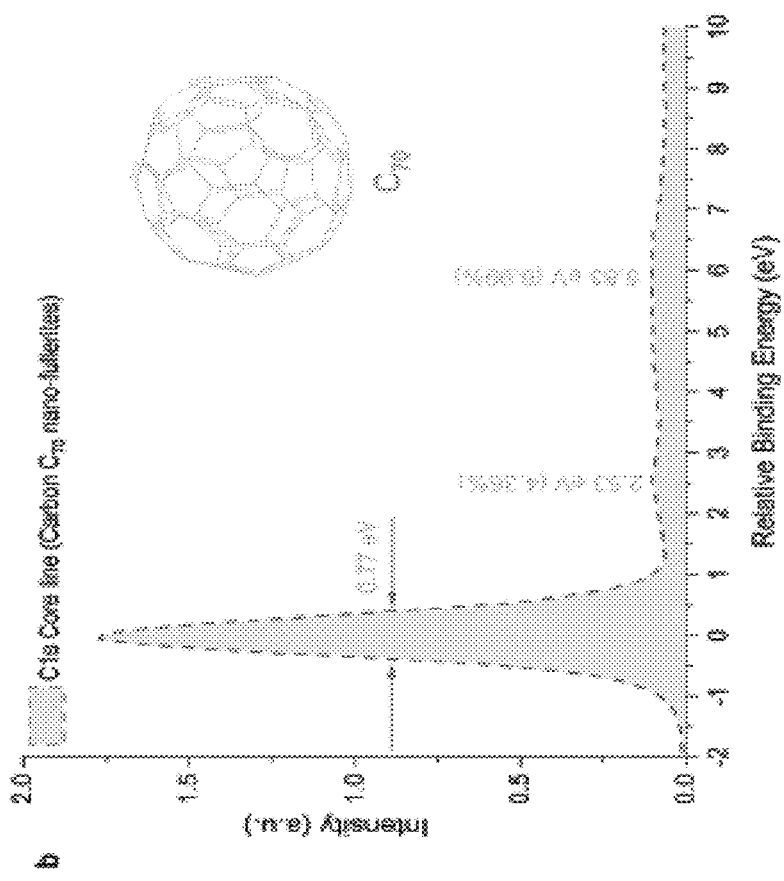
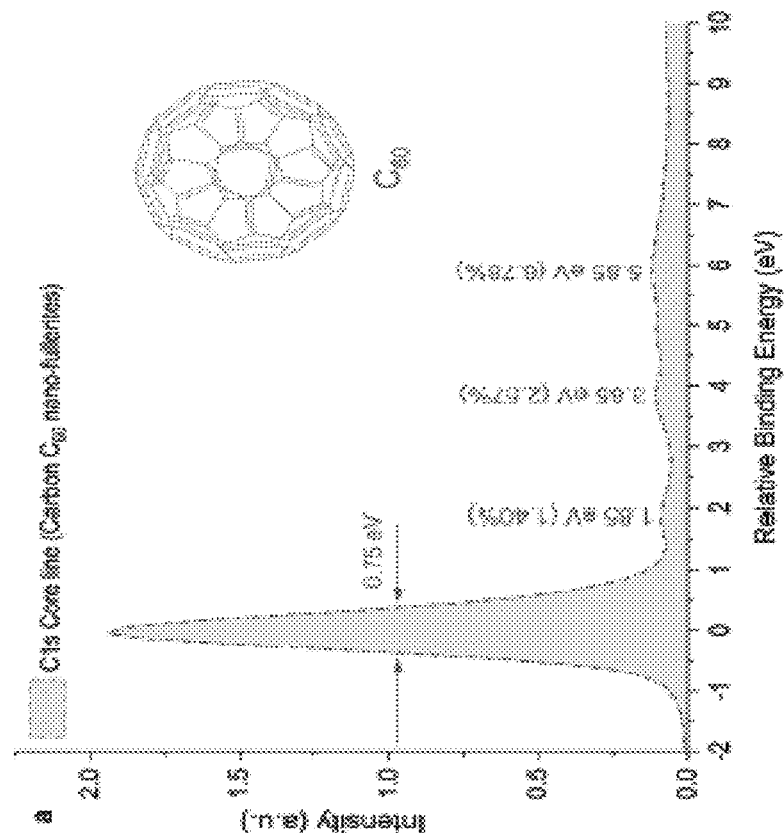
FIG 5A-B

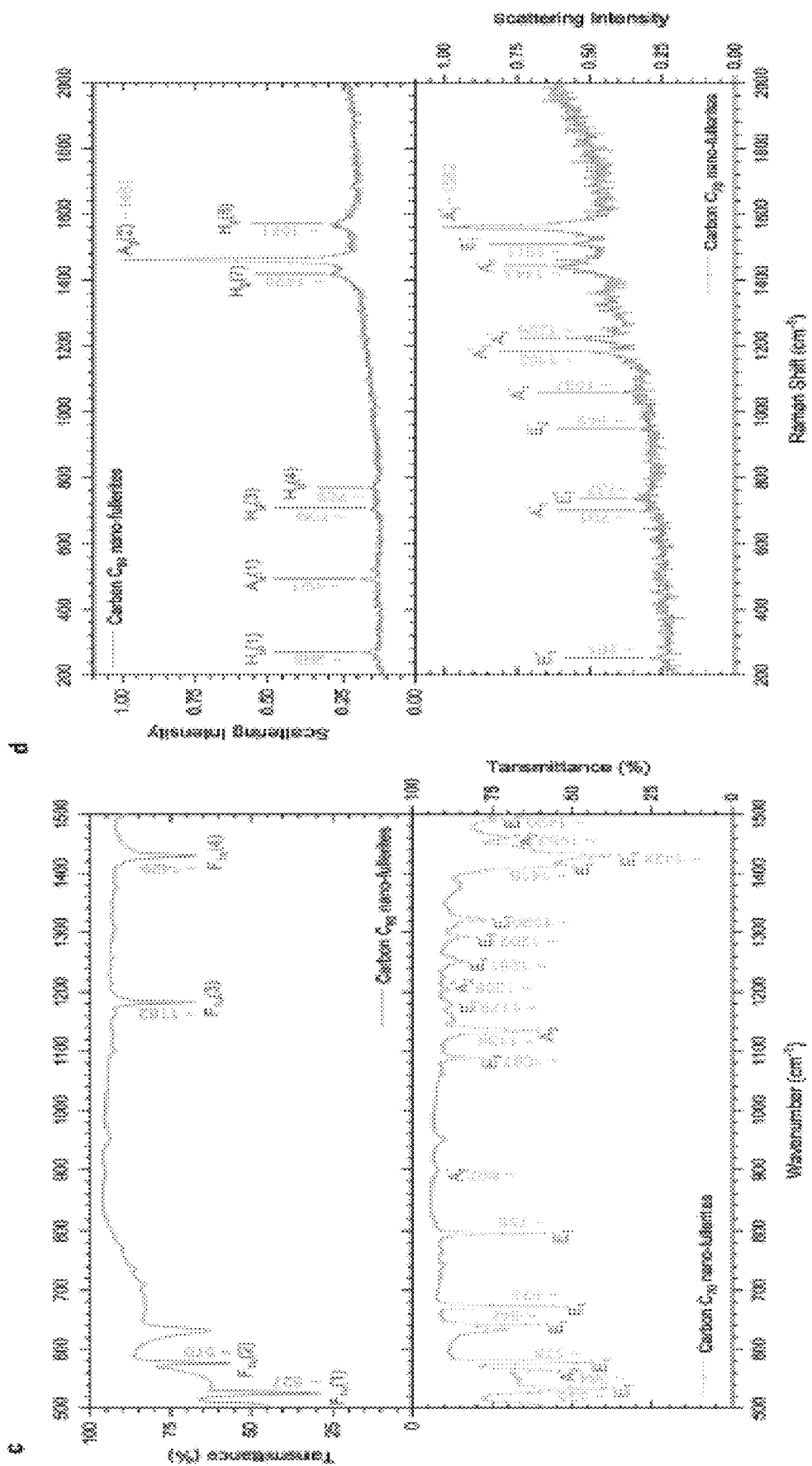
FIG. 5C-D

FIG. 10A-I

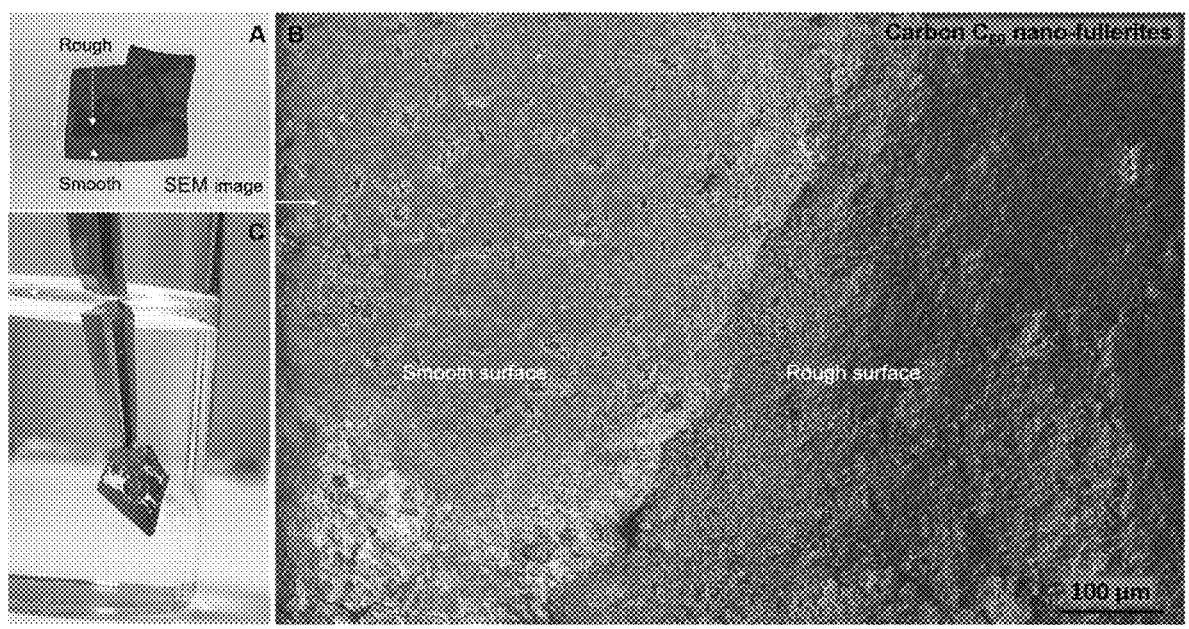
FIG. 12A-C

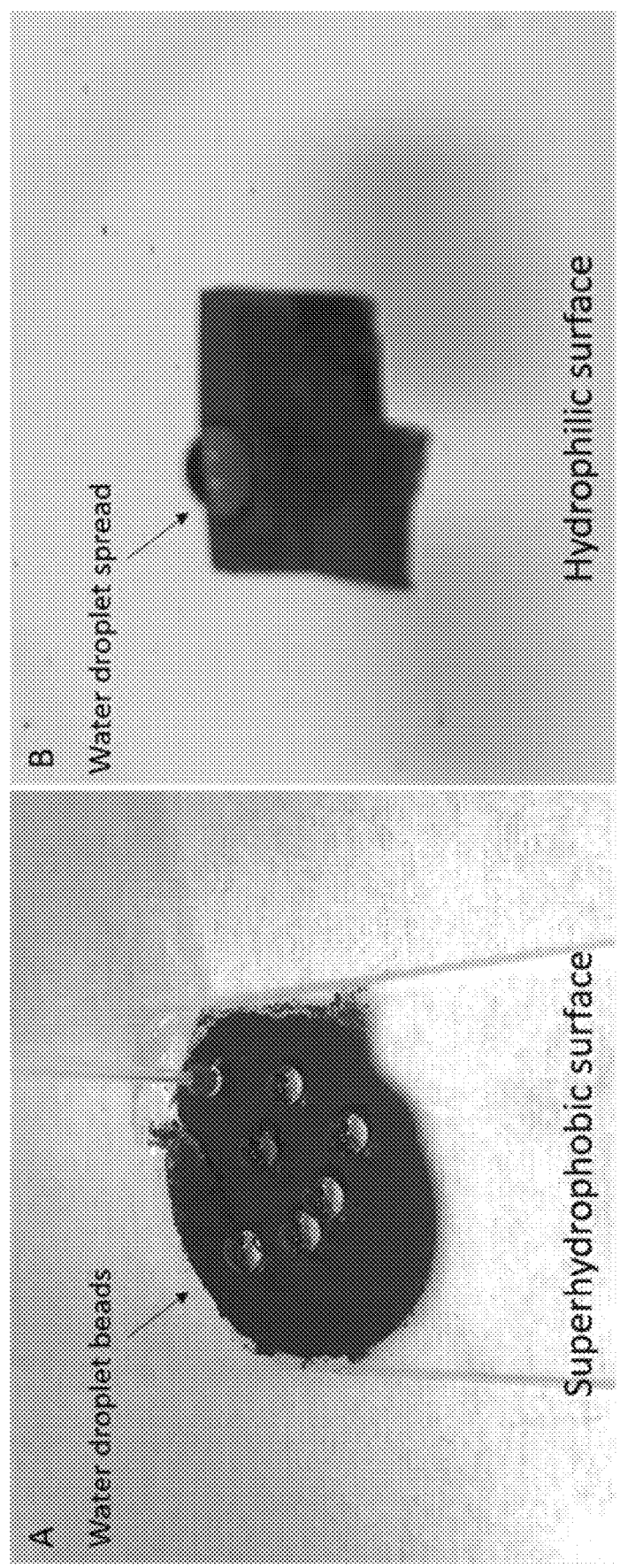
FIG. 13A-B

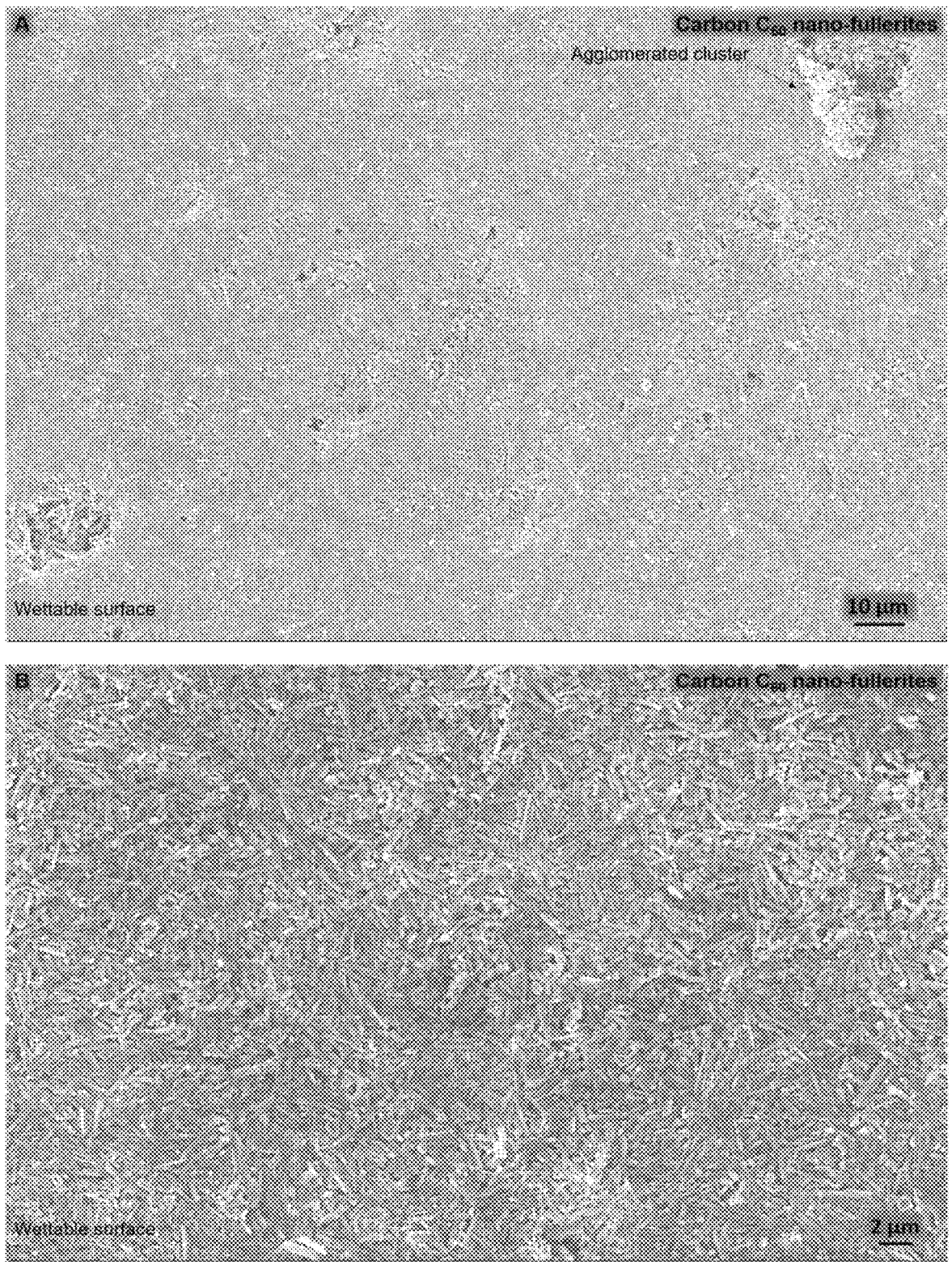
FIG. 14A-B

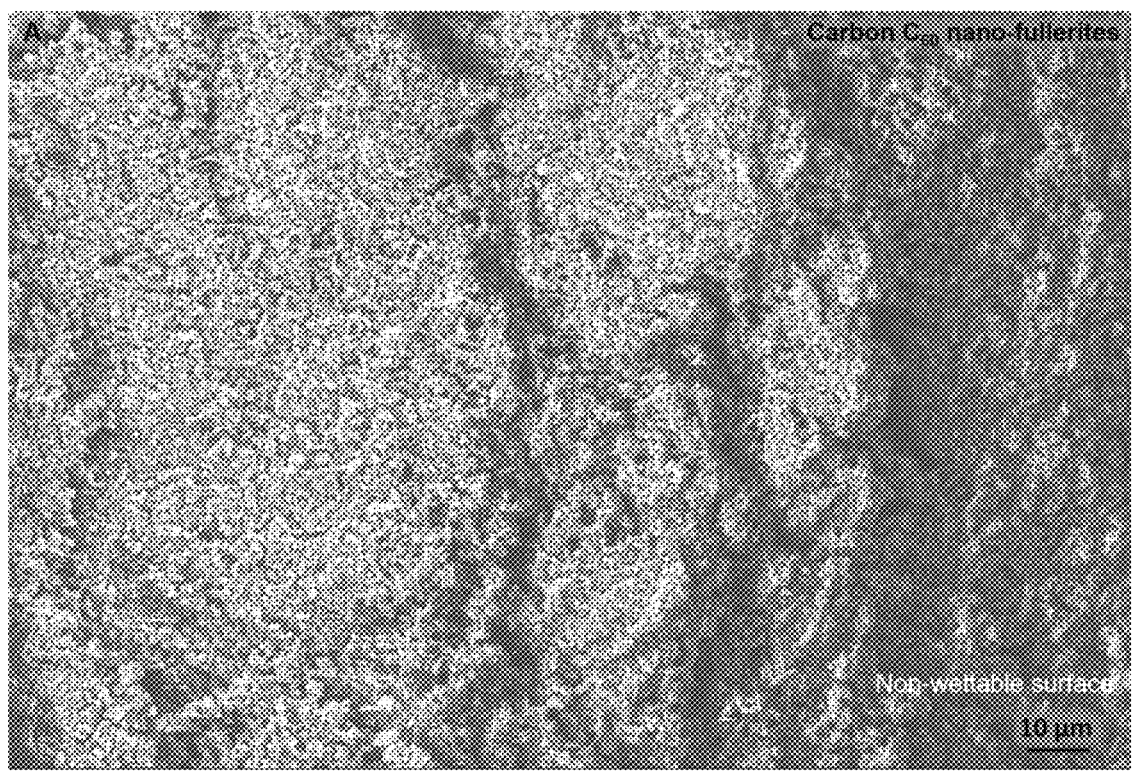
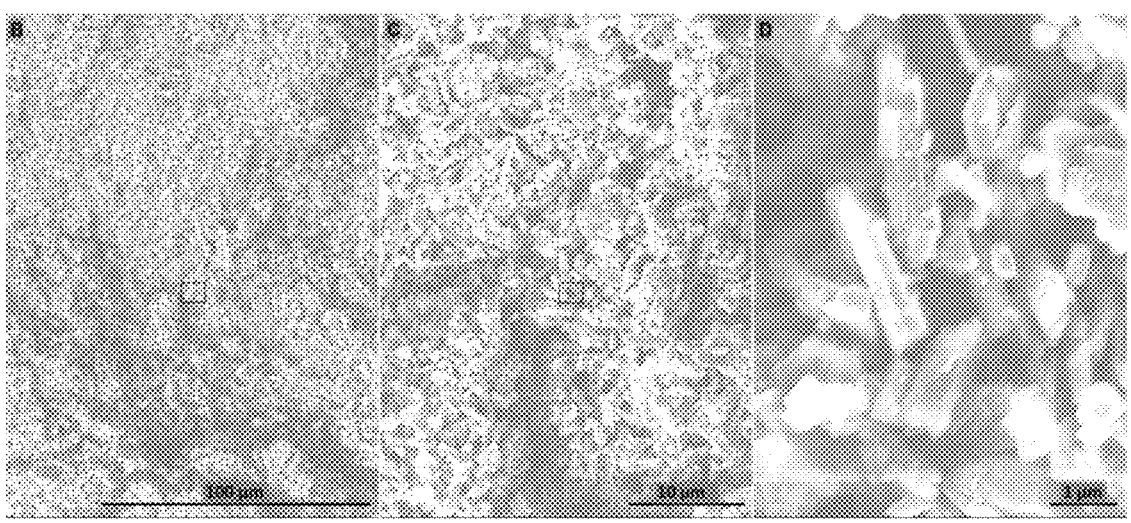
FIG. 15A-D

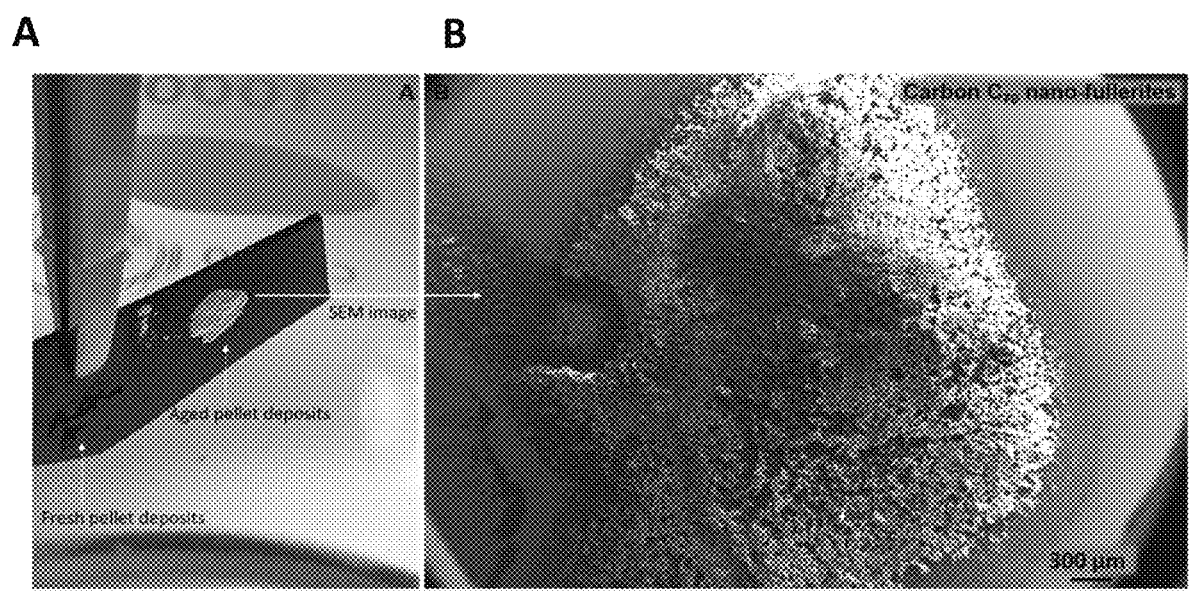
FIG. 16A-B

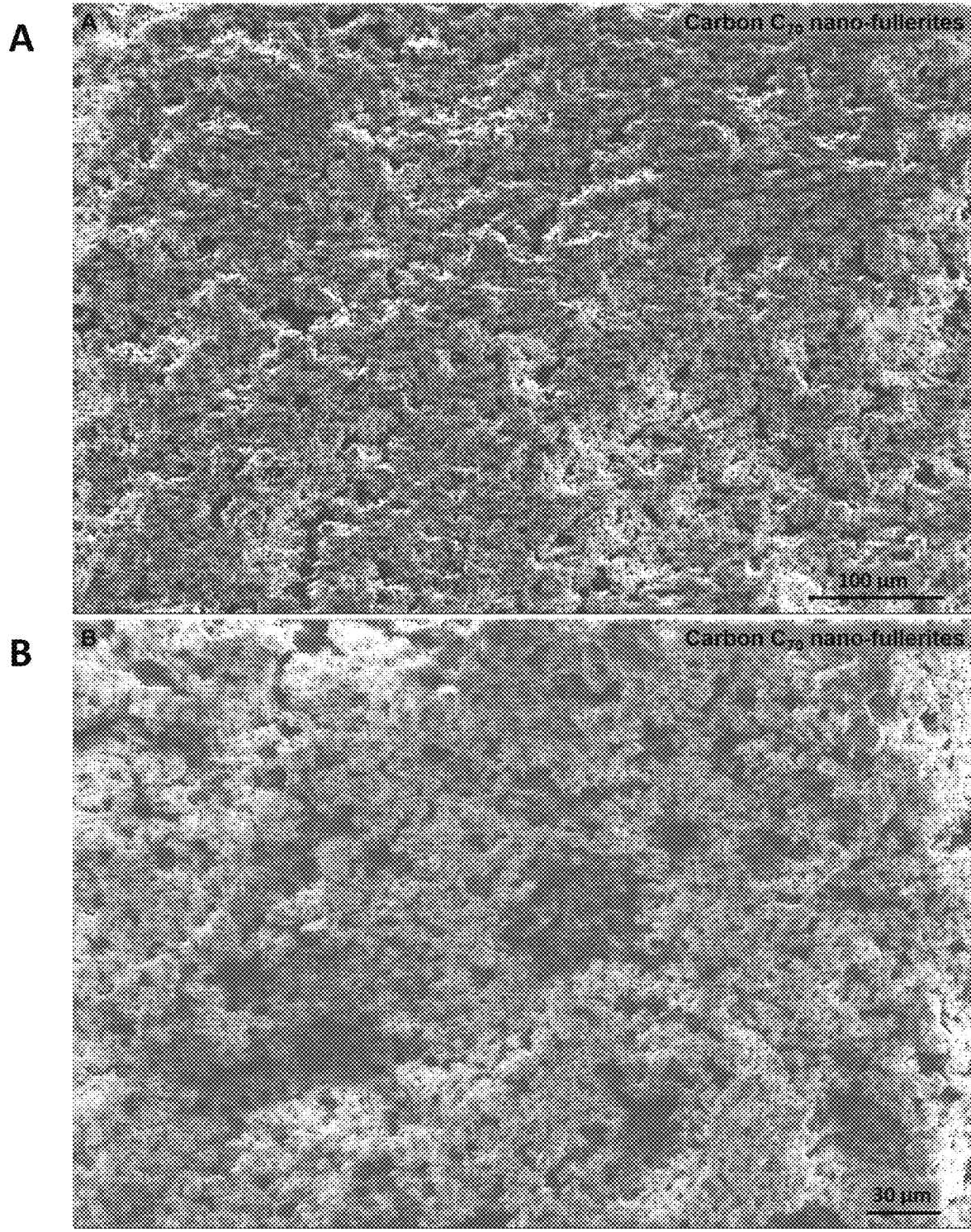
FIG.17A-B

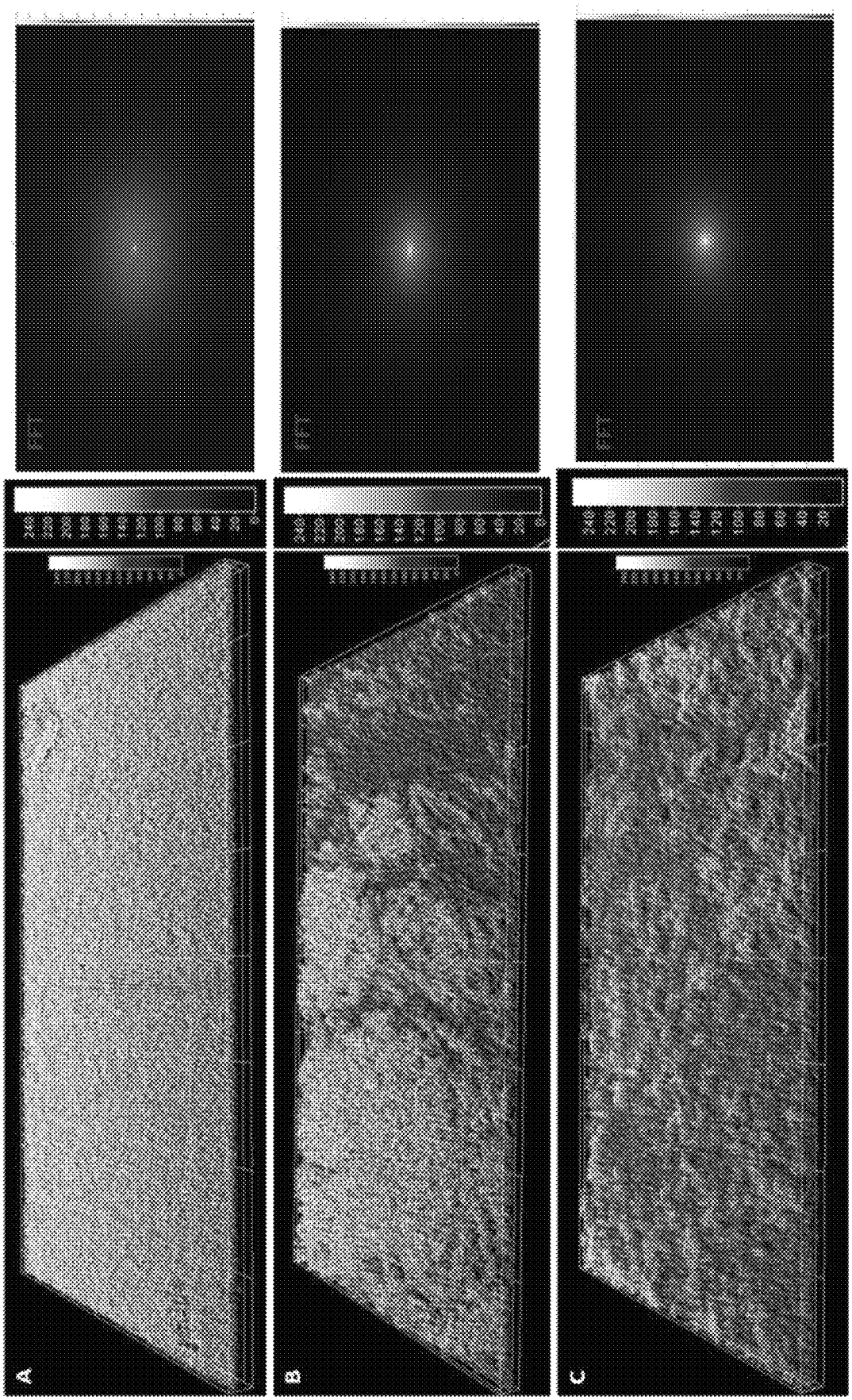
FIG. 18A-C

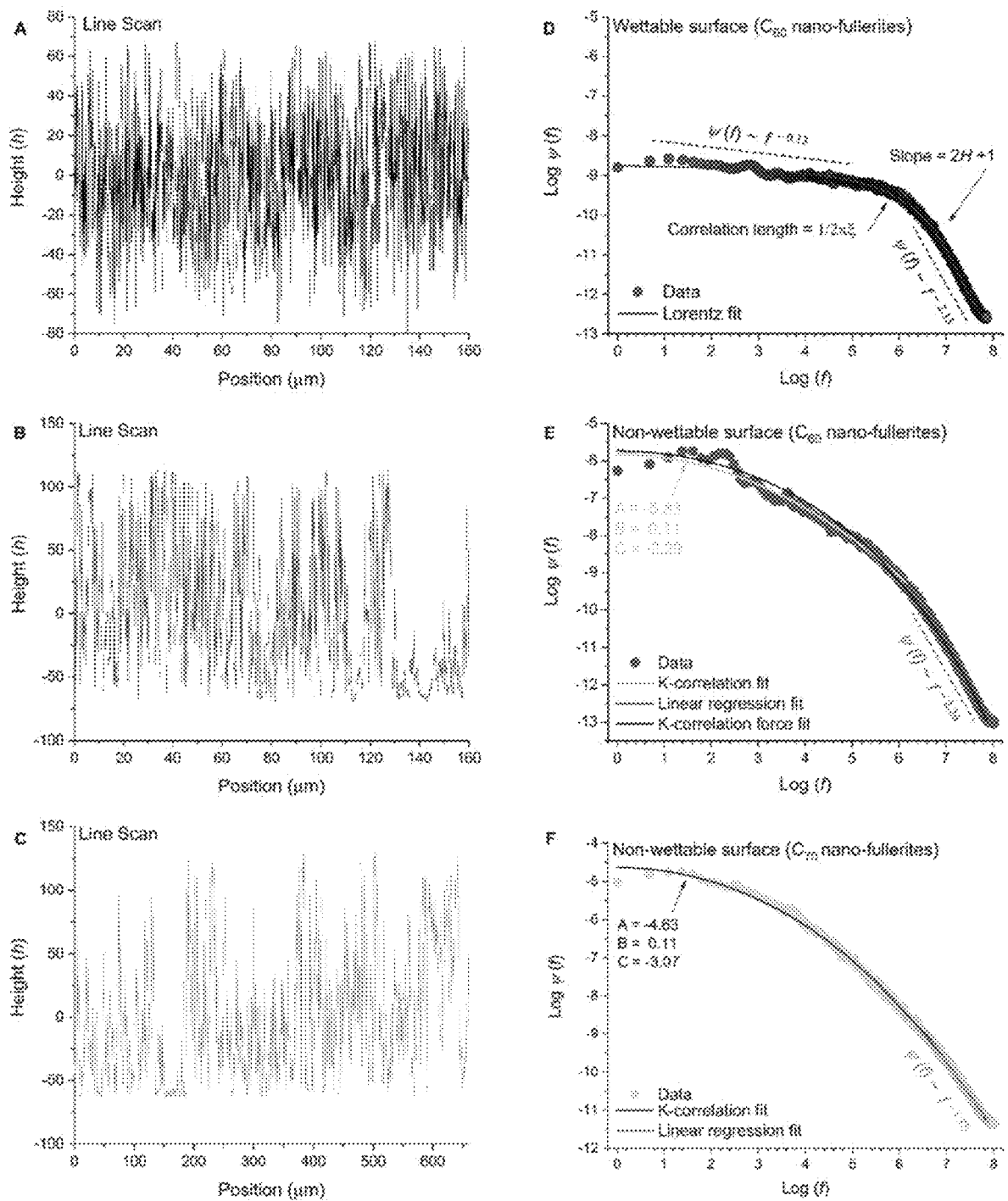
FIG. 19A-F

A
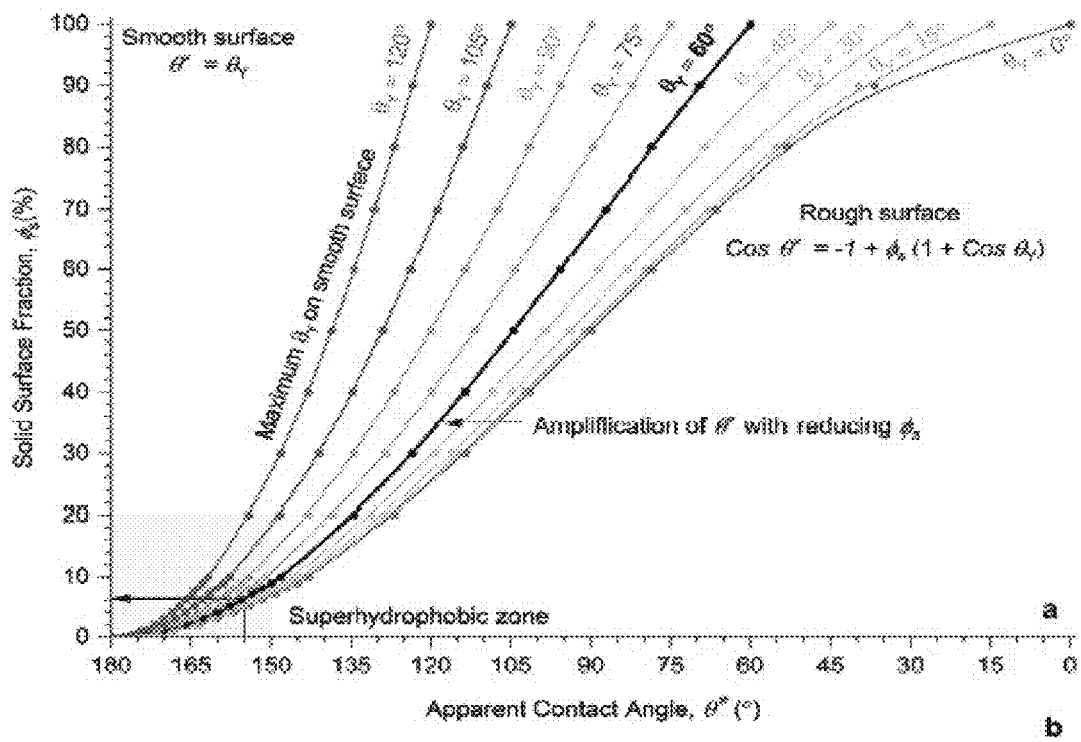
B
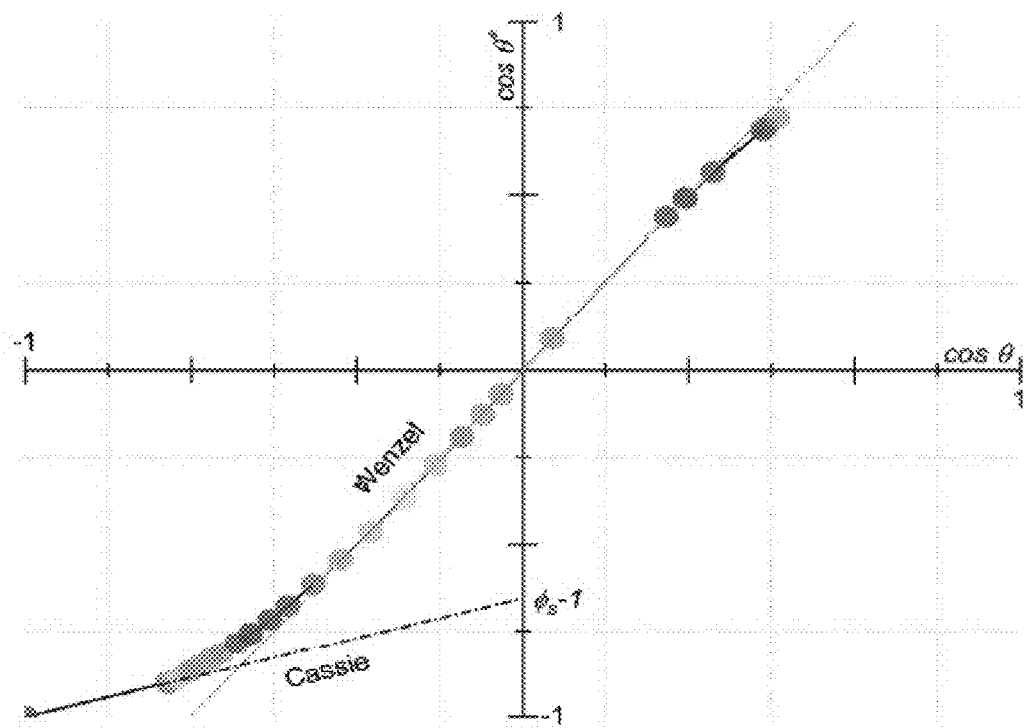
FIG. 21A-B

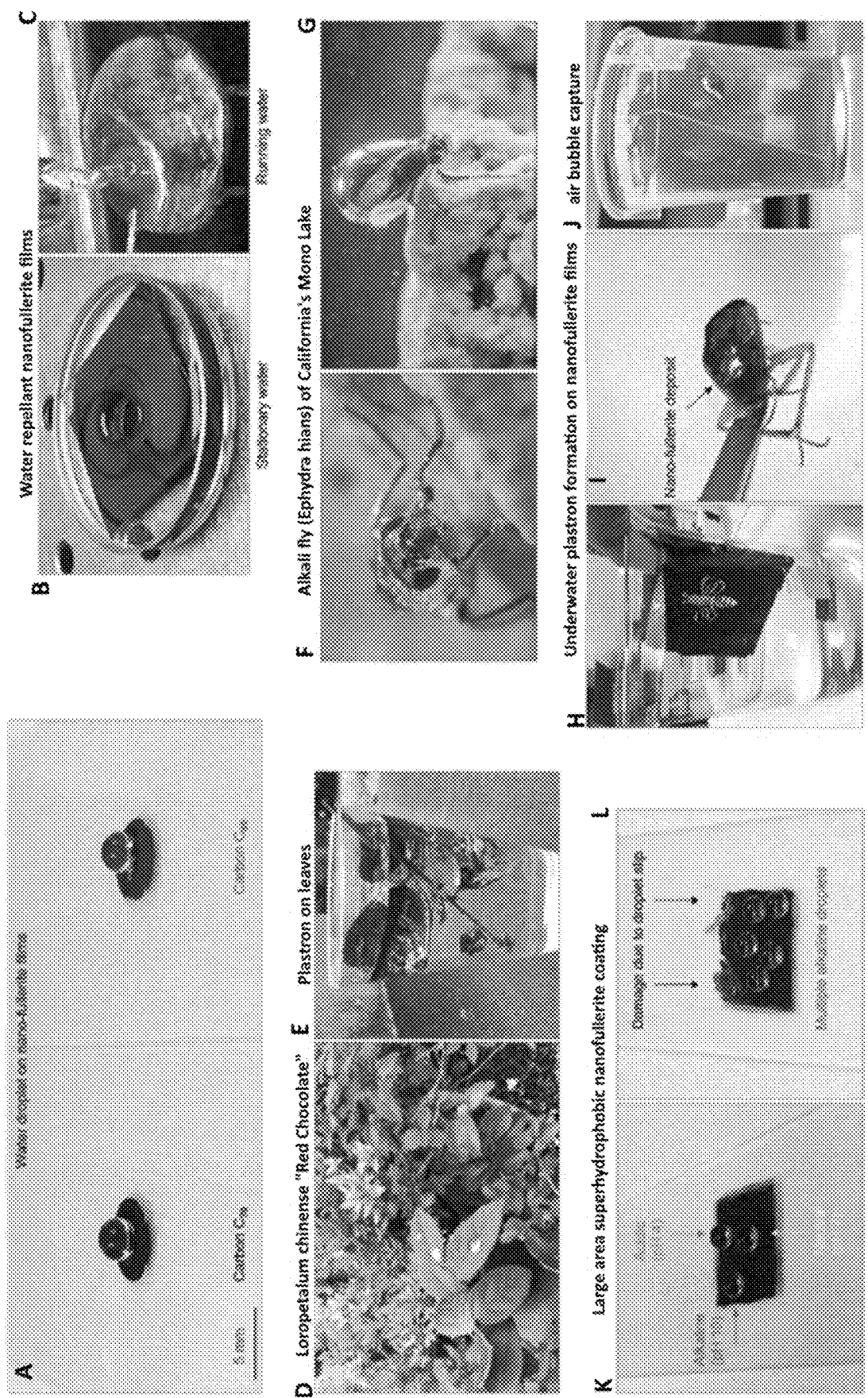
FIG. 22A-L

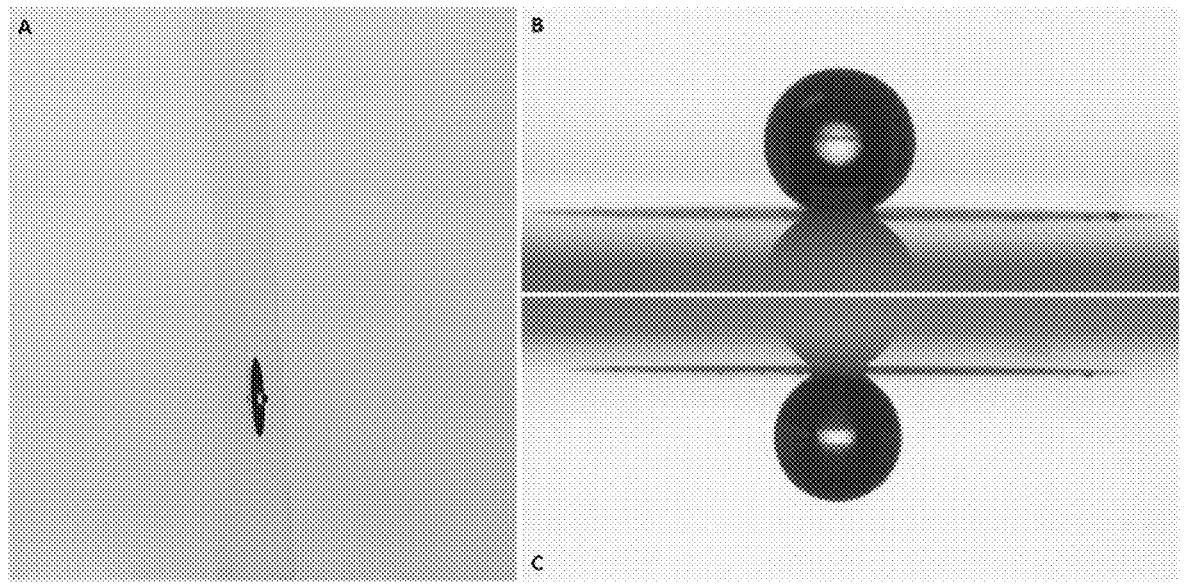
FIG. 23A-C
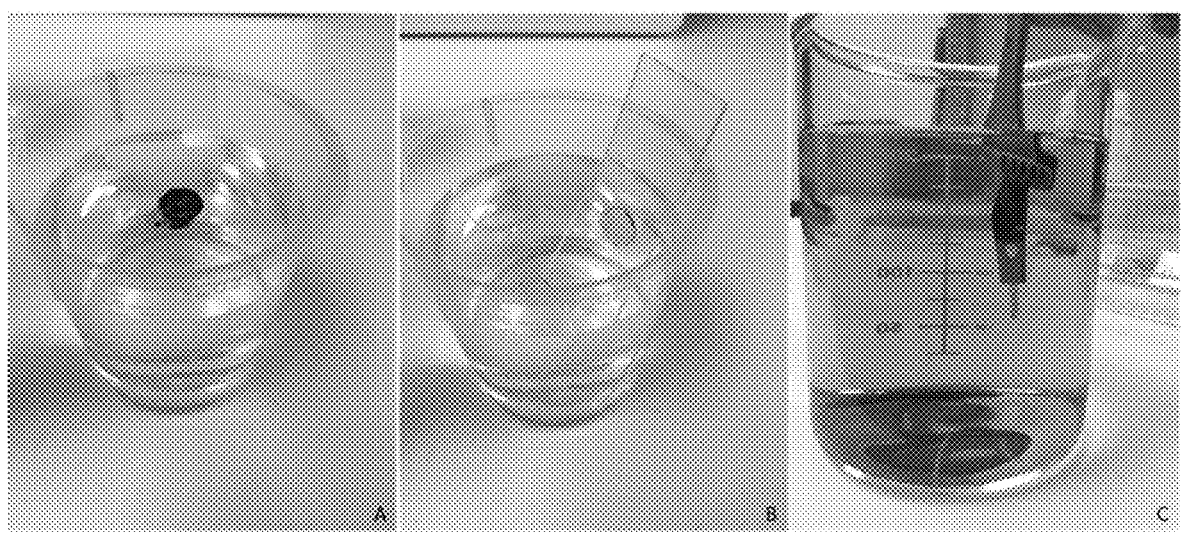
FIG. 24A-C

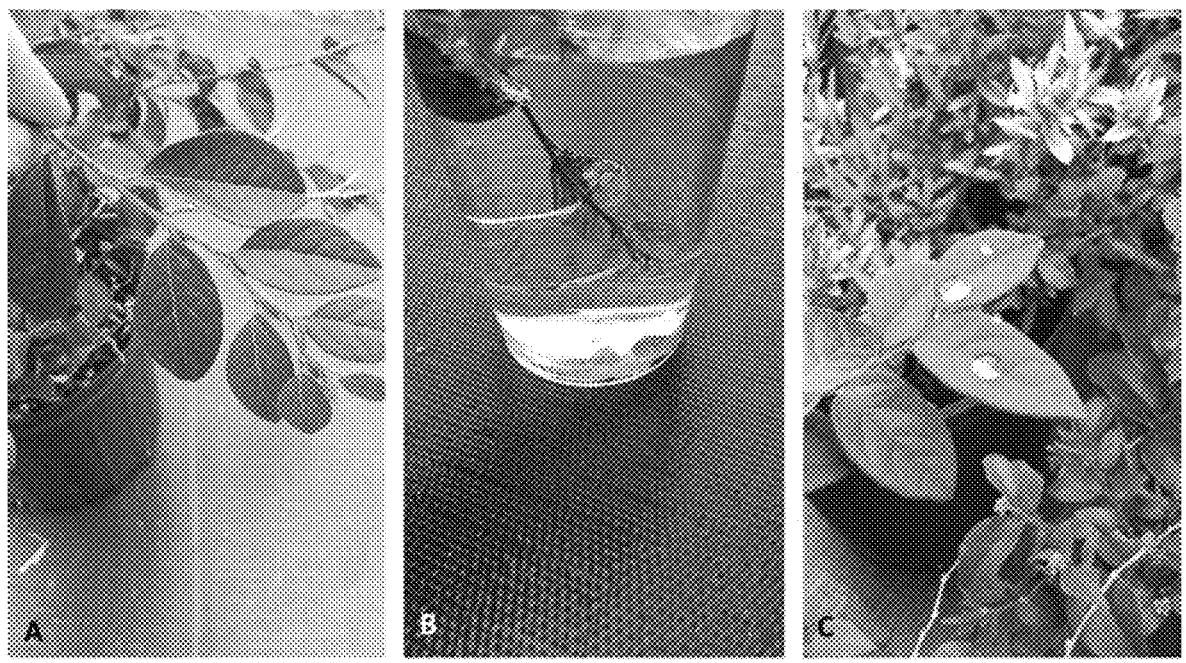
FIG. 25A-C
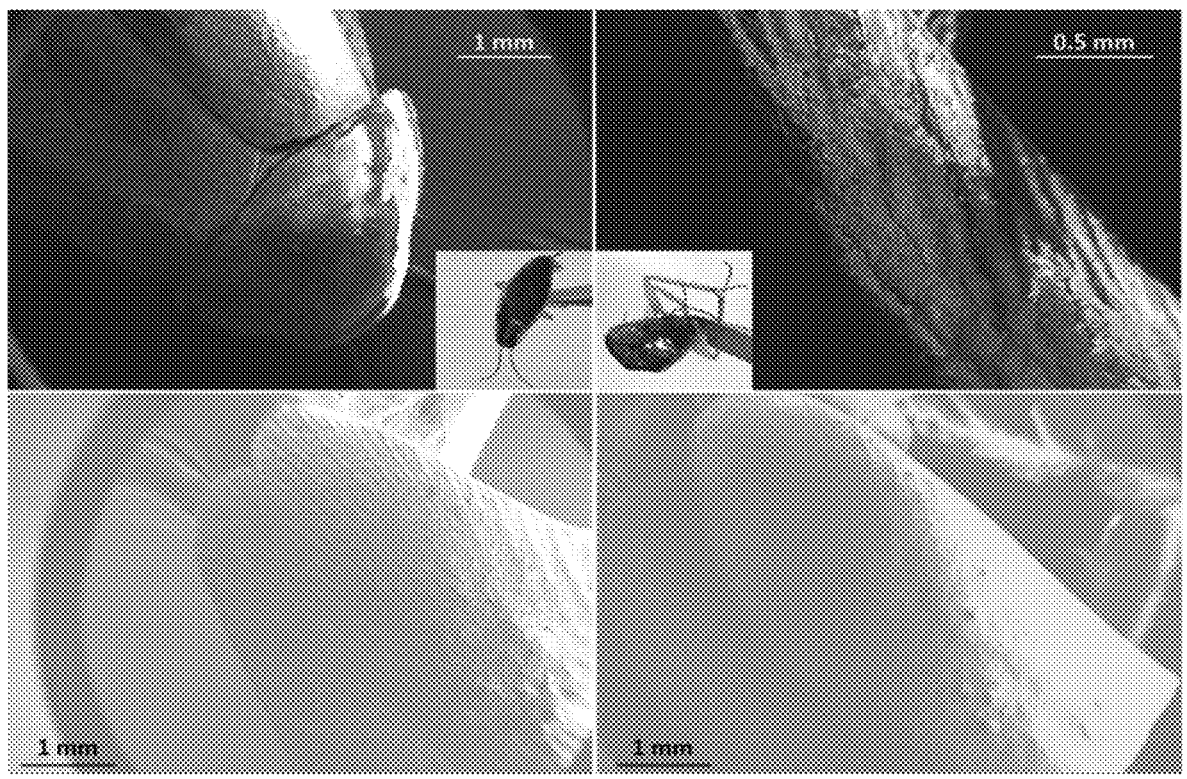
FIG. 26

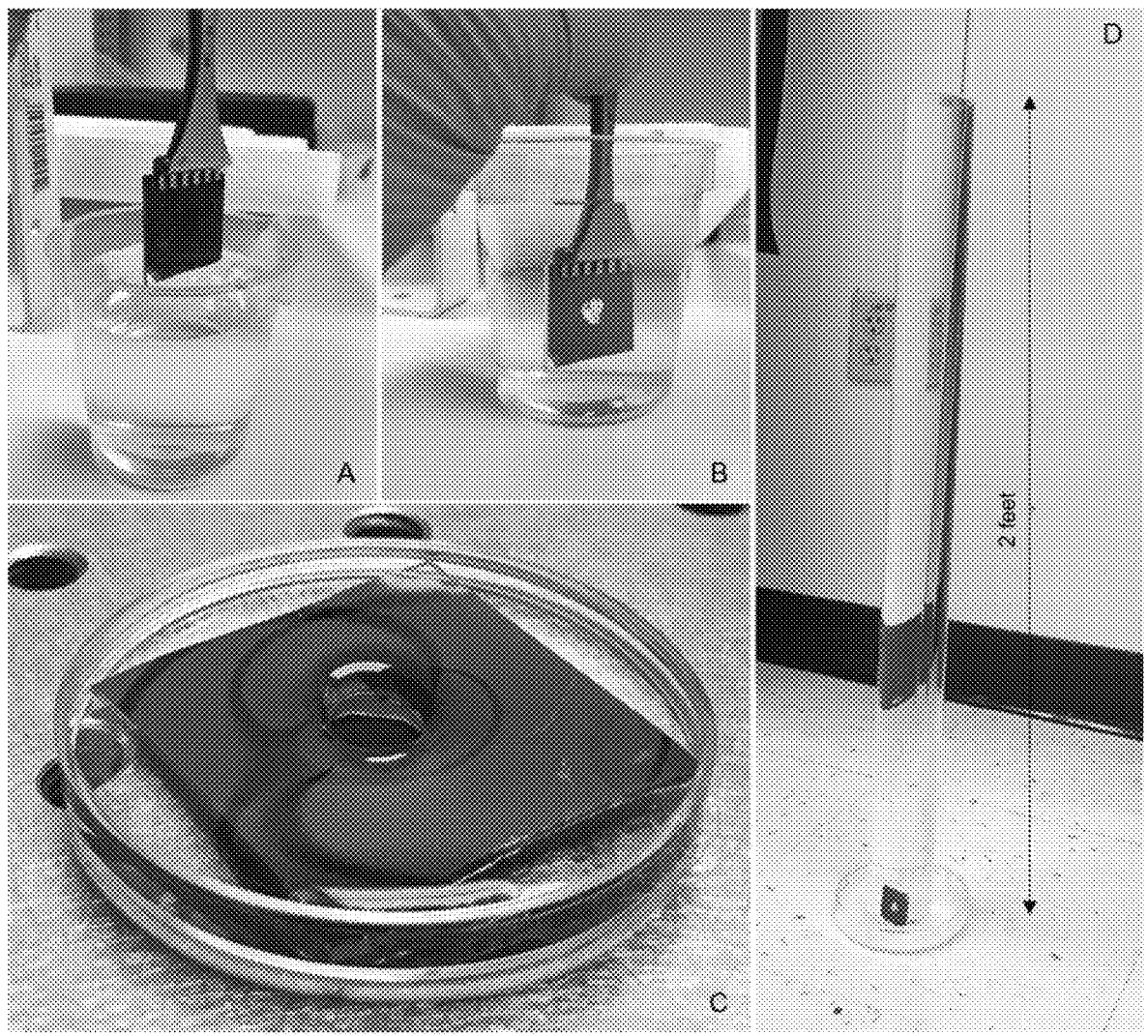
FIG. 27A-D

ORGANIC NON-WETTABLE SUPERHYDROPHOBIC FULLERITE FILMS

CROSS REFERENCE TO RELATED APPLICATIONS

This application is a nonprovisional of and claims priority to U.S. Provisional Patent Application Ser. No. 63/272,260, entitled "Organic Non-Wettable Superhydrophobic Fullerite Films", filed Oct. 27, 2021, the contents of which are hereby incorporated by reference into this disclosure.

GOVERNMENT SUPPORT STATEMENT

This invention was made with Government support under Grant No. ECCS-1920840 awarded by the National Science Foundation. The government has certain rights in the invention.

FIELD OF THE INVENTION

This invention relates to fullerite films ($C_{60}$ and $C_{70}$). More particularly, it relates to a method of producing nanostructured fullerite films from colloidal gels.

BACKGROUND OF THE INVENTION

Solubility of a solid substance in liquids is a physical constant, a measure of the maximum amount of solid solute that a liquid solvent can hold to form a true homogeneous solution at a specific temperature. The solubility of molecular solids of close-caged hollow carbon molecules coined as the fullerenes ($C_{60}$ and $C_{70}$) have been studied with an intense inquisitiveness, primarily because fullerenes are the only soluble form of carbon among many of its allotropes. They are also the largest molecules known to form and exist in space, even detected in the planetary nebula Tc-1 which is more than six thousand light-years away. (O. Berné, A. G. G. M. Tielens, *Proc. Natl. Acad. Sci. USA* 2012, 109, 401; J. Cami, J. Bernard-Salas, E. Peeters, S. E. Malek, *Science* 2010, 329, 1180).

It was expected that due to their unique symmetrically caged molecules with $sp^2$ carbons they would interact with solvents very differently, hence providing new insights about both kinetics and thermodynamics of solute-solvent interactions. Ruoff et al. conducted a detailed systematic study on solubility of fullerene $C_{60}$ in a variety of solvents, and concluded that there exists no universal solvent property that alone can explain or even predict the solubility of $C_{60}$. (R. S. Ruoff, D. S. Tse, R. Malhotra, D. C. Lorents, *J. Phys. Chem.* 1993, 97, 3379) In addition, it was discovered that solubility of $C_{60}$ has an anomalous temperature dependence with dissolution of $C_{60}$ being exothermic above room temperature and endothermic below. (R. S. Ruoff, R. Malhotra, D. L. Huestis, D. S. Tse, D. C. Lorents, *Nature* 1993, 362, 140). These results motivated experimental studies on fullerene $C_{70}$ which also showed similar solubility behavior. (R. J. Doome, S. Dermaut, A. Fonseca, M. Hammida, J. B. Nagy, *Fullerene Sci. Technol.* 1997, 51593).

Ambiguity persists on the solubility of fullerenes, and there exists discrepancies in reported solubility data. High solubility is usually observed at room temperatures in solvents having high refractive indices, large molecular volumes, and dielectric constants close to four. Depending on the solvent nature, solubility of $C_{60}$ and $C_{70}$ can vary up to several orders of magnitude. For example, solubility of $C_{60}$ in its weak solvents (alcohols) like methanol is$\approx$0.01 mg $mL^{-1}$ and in strong solvents (naphthalenes) such as 1-chloronaphthalene is$\approx$50 mg $mL^{-1}$. (R. S. Ruoff, D. S. Tse, R. Malhotra, D. C. Lorents, *J. Phys. Chem.* 1993, 97, 3379). When solutions of fullerenes dissolved in their strong solvents are interfaced with their weak solvents; the resulting liquid-liquid interface can create solid crystals of fullerenes (fullerites). (K. Miyazawa, A. Obayashi, M. Kuwabara, *J. Am. Ceram. Soc.* 2001, 84, 3037)

Crystals are principally conceived by reducing the solute solubility in a nearly saturated solution via interfacing it with a solvent in which solute is sparingly soluble. This results in supersaturation, which initiates nucleation (onset of phase separation) and subsequent growth of crystals. The precise theory and mechanism of crystallization from supersaturated solutions remains unclear to date and is often debated. (R. E. Schreiber, L. Houben, S. G. Wolf, G. Leitus, Z.-L. Lang, J. J. Carbó, J. M. Poblet, R. Neumann, *Nat. Chem.* 2017, 9, 369). In particular, nucleation pathways and the critical cluster size of molecules requisite for crystal growth. (J. F. Lutsko, *Sci. Adv.* 2019, 5, eaav7399). This solubility difference driven approach, often referred to as the antisolvent crystallization, is employed extensively in pharmaceutical industries for purification and separation processes to create a variety of nano-micro sized molecular structures including solvates, co-crystals, and polymorphs. Not only is purity considered in clinically regulated drugs that have been prepared as oral tablets, but the solubility and wettability parameters as well, which are vital to their function. These parameters may be tuned via control over crystal structure, size, and habit.

Advanced versions of this technique to grow high purity fullerene crystals are also engendering significant interest with the demonstration of schemes to achieve control over crystal morphology, as elucidated in a recent report on nano-pottery of $C_{60}$. (F. Han, R. Wang, Y. Feng, S. Wang, L. Liu, X. Li, Y. Han, H. Chen, *Nat. Commun.* 2019, 10, 1548). Yet, high-throughput growth of fullerene crystallites, their utilization in schemes to develop solution processable films, and subsequent use of films in potential applications remains heretofore unexplored.

Solution-cast fullerite films are of high importance considering their widespread use in organic optoelectronic devices as these materials are the best-known electron acceptors along with their high electron affinity and mobility. A majority of these applications make use of vacuum-sublimed $C_{60}$ films whilst $C_{70}$ remains a scarcely utilized material. The inventors are the first to present a facile scheme to produce nanostructured solution-cast films of fullerene $C_{60}$ and $C_{70}$ from their colloidal gels. To this end, the inventors make use of solubility difference driven crystallization principles to grow nano-sized fullerene crystals and the gelation of these crystals following centrifugal enrichment. Surface wetting characterization done via sessile droplet goniometry revealed that formation of films from such gels generates a superhydrophobic surface, and the resulting films as a whole are non-wettable.

Wettability is a surface property of solids, typically determined by the contact angle of a water droplet resting on its surface. The contact angle of such a water droplet can be used to determine several surface properties of the material. For example, contact angle of a water droplet on poly (tetrafluoroethylene) surface (Teflon) can approach a maximum of $\approx$116°. A solid surface is classified as superhydrophobic when contact angle exceeds 150°, the contact angle hysteresis is low and the wetting state (Cassie) demonstrates high stability. Such high contact angles (>120°) cannot be achieved by surface treatment or chemical functionalization;

it is essential for the physical topography of the surface to be rough at nano-micrometer scale in such a way that its morphology may facilitate the entrapment of air underneath the droplet. This is revealed by examination of superhydrophobic surfaces of several plants and biological species which have naturally selected and adapted them over the evolutionary phases. (W. Barthlott, C. Neinhuis, Planta 1997, 202, 1). A classic example is the surface of *Nelumbo nucifera* (Indian lotus) leaf, formed of micrometer sized papillae with nanoscale branches coated with an intrinsic hydrophobic material (epicuticular wax). Fullerenes are hydrophobic molecules with fullerite solubility in water is estimated to be on the order of ≈10-10 ng mL$^{-1}$. (D. Heymann, *Fullerene Sci. Technol.* 1996, 4, 509). Vacuum-sublimed fullerite films, however, have not been observed to form superhydrophobic surfaces. Possibly, because sublimation precludes deposition of nanostructured films with surfaces that permits existence of a non-wetting topology. In fact, smooth surfaces of fullerites are hydrophilic in nature displaying a water droplet contact angle of 60°. (X. Ma, B. Wigington, D. Bouchard, *Langmuir* 2010, 26, 11886).

Numerous superhydrophobic surfaces have been reported to date. (S. Parvate, P. Dixit, S. Chattopadhyay, *J. Phys. Chem. B* 2020, 124, 1323). The majority of them make use of inorganic materials or metals with few exceptions on multi-organic materials. (C. Peng, Z. Chen, M. K. Tiwari, *Nat. Mater.* 2018, 17, 355). They are developed by creating a rough surface using either photolithography, chemical vapor deposition, self-assembly, or electrochemical etching; and typically require additional multi-fluorination or silane treatment.

The majority of previously reported hydrophobic surfaces have been achieved by designing microscopic patterns that involves complex lithography or etching processes that cannot be performed on all surfaces. Not all hydrophobic surfaces previously developed remain dry when submerged underwater for more than a few minutes at a certain water depth.

In light of the aforementioned shortcomings, what is needed is a novel method of producing nanostructured solution-cast films of fullerene $C_{60}$ and $C_{70}$ from their colloidal gels as well as a method of producing non wettable superhydrophobic surfaces without the requirement of fluorination or silane treatment and that does not involve complex processes such as lithography and etching.

SUMMARY OF INVENTION

Fullerenes are carbon molecules discovered in space, their origin and presence in hydrogen-rich interstellar medium remains an unresolved mystery. In the laboratory, solid fullerenes (fullerites) are obtained by extracting them from soot collected via evaporating graphite in a helium atmosphere. Fullerites possess unique electronic properties, for this reason they are sublimed in vacuum at high temperatures to grow films which are extensively used in optoelectronic devices.

The inventors found that if films are produced using colloidal gels, densely packed nano-structured rough surfaces are generated such that the wetting behavior is dramatically tuned from hydrophilic to superhydrophobic despite the fact that these materials have a high surface energy. The inventors show that a superhydrophobic surface with contact angle of ≈155° exhibiting non-wettability can be created simply by a drop of fullerite gels. The inventors make use of self-affine fractal theory and apply wetting models to explain and examine the origin of non-wettability. Furthermore, the inventors demonstrate underwater stability and plastron formations of the films that mimic hydrocarbon surface of alkali fly which survives in highly alkaline waters of California's Mono Lake. Artificial plastron formation and plastron recovery in situ, along with photoinduced chemical reactivity of $C_{60}$ and $C_{70}$ which can inactivate enveloped viruses, makes these non-wettable films unique. Fullerite gels can be applied on any surface without requiring any additional process steps; and can be deployed directly for biochemistry, rheological experiments, and plethora of practical applications requiring hydrophobicity.

The inventors have developed a novel supplant solution-based method to produce nanostructured fullerite films from colloidal gels. Surprisingly, the inventors found that the resulting films have a superhydrophobic surface. Water droplets bead on them like a pearl resting in a Fakir state. Films are extremely water repellent and non-wettable. When submerged in water, the films stay dry up to three hours even at a water depth of two feet, unveiling the plastron effect. Gels are scalable as pastes to develop large-area functional superhydrophobic coatings on a range of platforms and can withstand acidic and alkaline solutions. Contrary to the conventional approach to develop evolution inspired superhydrophobic coatings based on inorganic materials and metals—that require photolithography, chemical etching and a hydrophobic topping—the inventors found that this can be achieved simply by a drop of gel, with added flexibility and multifunctionality.

By placing a drop of a gel created from fullerites on any surface, a super water repellent state is triggered. The unique cage-like structure of the gel does not interfere with the original material being treated, which means they preserve their unique functional properties. As such, the new super surface can potentially be used for splitting water, bacterial disinfection, hydrogen generation or electrocatalysis—all of which can be generated in fluid environments. For example, the new gel makes splitting electrocatalysis easier, which could lead to more efficient fuel cells and water repellent display panels. The same gel can lead to better electron acceptors, which are key in developing highly sensitive detectors and sensors for toxic gases.

In an embodiment, a method of producing a superhydrophobic fullerite film is presented comprising: growing nanofullerites using a sonication coupled crystallization procedure; aging the nano-fullerites over a period of time to form a colloidal gel; and depositing the colloidal gel onto a substrate to form the superhydrophobic fullerite film. In some embodiments, the gel is deposited onto the substrate by drop casting.

The sonication coupled crystallization procedure is comprised of the steps of: dissolving an amount of fullerene powder in a solvent to form a solution; sonicating the solution with an antisolvent to induce crystallization; washing the solution with fresh antisolvent to form a suspension; centrifuging the suspension; and separating supernatant from the suspension to leave a pellet of nano-fullerites.

The solvent may be an organic solvent of fullerenes including, but not limited to, carbon disulfide, toluene, xylenes, and dichlorobenzene. The antisolvent may be an alcohol including, but not limited to, isopropyl alcohol, methanol, and butanol.

The aging process of the nanofullerites may occur by storing the nanofullerites in tubes for at least three weeks to allow the nanofullerites to agglomerate into a gel.

In an embodiment, a non-wettable superhydrophobic film based on a single organic material is presented comprising fullerite $C_{60}$ or $C_{70}$ nanocrystals wherein the non-wettable superhydrophobic film is formed by the steps comprising: dissolving an amount of a $C_{60}$ or $C_{70}$ fullerene powder in a solvent to form a solution; sonicating the solution with an antisolvent to induce crystallization; washing the solution with fresh antisolvent to form a suspension; centrifuging the suspension; separating supernatant from the suspension to leave a pellet of nanofullerites; storing the pellet for at least 3 weeks to allow the pellet to agglomerate into a gel; and depositing the gel onto a substrate to form the non-wettable superhydrophobic film. In some embodiments, the gel is deposited onto the substrate by drop casting.

The non-wettable superhydrophobic film is formed in the absence of additional treatments such as fluorination or silane treatments and without complicated processes such as etching or lithography.

The solvent may be selected from the group including, but not limited to, carbon disulfide, toluene, xylenes, and dichlorobenzene. The antisolvent may be an alcohol including, but not limited to, isopropyl alcohol, methanol, and butanol.

In a further embodiment, a method of producing a superhydrophobic fullerite large area coating is presented comprising: growing nano-fullerites using a sonication coupled crystallization procedure; aging the nano-fullerites for at least three weeks to form a colloidal gel; depositing the colloidal gel onto a substrate; and scaling the colloidal gel into a paste to form the superhydrophobic fullerite large area coating. In some embodiments, the gel is deposited onto the substrate by drop casting.

The sonication coupled crystallization procedure is comprised of the steps of: dissolving an amount of fullerene powder in a solvent to form a solution; sonicating the solution with an antisolvent to induce crystallization; washing the solution with fresh antisolvent to form a suspension; centrifuging the suspension; and separating supernatant from the suspension to leave a pellet of nano-fullerites.

The solvent may be selected from the group including, but not limited to, carbon disulfide, toluene, xylenes, and dichlorobenzene. The antisolvent may be an alcohol including, but not limited to, isopropyl alcohol, methanol, and butanol.

BRIEF DESCRIPTION OF THE DRAWINGS

For a fuller understanding of the invention, reference should be made to the following detailed description, taken in connection with the accompanying drawings, in which:

FIG. 1A-D are a series of images depicting solution-cast $C_{60}$ and $C_{70}$ nano-fullerite films. A) Photographs in sequence illustrate a simple route to obtain high-purity fullerene nanocrystallites. Photograph 1 shows raw fullerene $C_{60}$ and $C_{70}$ powder which is dissolved in $CS_2$. Photograph 2 shows the resulting solutions of $C_{60}$ (top vial) and $C_{70}$ (bottom vial), which were injected into IPA kept under ultrasonication. Photograph 3 shows the product obtained after the crystallization of fullerenes and sonication process. Photograph 4 shows suspensions of nano-fullerites after repeated washing with fresh IPA. Photograph 5 shows uniformly dispersed $C_{60}$ and $C_{70}$ colloidal solutions prepared for centrifugation. Photograph 6 shows nano-fullerites completely separated from the dispersant after centrifugation. This enrichment allows dense packing of nano-fullerites as a pellet-a prerequisite for their gelation. B) TEM images of $C_{60}$ and $C_{70}$ nano-fullerites (left). High-resolution microscopy images (middle) taken at the edges of $C_{60}$ and $C_{70}$ nano-fullerite revealing ordered lattice fringes and their respective FFT pattern (right). C) SEM images of $C_{60}$ and $C_{70}$ nano-fullerites. The inset to the microscopy images shows the size distribution profiles of $C_{60}$ and $C_{70}$ nano-fullerites. The magnified microscopy images display the typical crystal habit of $C_{60}$ (elongated) and $C_{70}$ (globular). D) Solution-cast $C_{60}$ and $C_{70}$ films deposited on glass slides from their colloidal gels. These films are superhydrophobic and non-wettable.

FIG. 2A-C are a series of images depicting microscopy of $C_{60}$ nano-fullerites. (A) High-resolution scanning electron micrograph of carbon $C_{60}$ nano-fullerites taken at 5 kV. Crystals were conceived via creating an ultrasonic liquid-liquid interface between fullerene dissolved in $CS_2$ and IPA. (B) Transmission electron micrograph of $C_{60}$ nano-fullerites showing their typical elongated crystal habit with their dimensions approaching nanoscale. (C) High-resolution transmission electron micrograph taken at the edge of individual $C_{60}$ nano-fullerite crystal.

FIG. 3A-C are a series of images depicting microscopy of $C_{70}$ nano-fullerites. (A) High-resolution scanning electron micrograph of carbon $C_{70}$ nano-fullerites acquired at 5 kV. Unlike $C_{60}$ (FIG. 2), $C_{70}$ crystallized in a globular habit with average dimensions close to five hundred nanometers. (B) Low magnification transmission electron micrograph of $C_{70}$ nano-fullerites (C) High-resolution transmission electron micrograph taken at the edges of $C_{70}$ nano-fullerite crystal, parallel lattice fringes can be seen along their growth direction.

FIG. 5A-B are a series of images depicting electronic and vibrational spectroscopy of $C_{60}$ and $C_{70}$ nano-fullerite films: (A,B) Energy positions of camelback-like satellite features of both fullerenes referenced to their X-ray photoelectron C 1s main peak. The first peak in both materials is due to direct electronic transition between bands. For $C_{60}$ peak at $\approx 3.85$ eV is attributed to dipole forbidden monopole like transition, followed by a peak at $\approx 5.85$ eV due to dipole allowed $\pi$ to $\pi^*$ transitions. For $C_{70}$ the peak at $\approx 5.83$ is attributed to excitation of $\pi$ plasmons. Inset to the respective figure is the molecular structure of $C_{60}$ and $C_{70}$. The FWHM of $C_{70}$ C1s line is observed 0.20 eV broader than that of $C_{60}$ reflecting the five non-equivalent carbon atomic sites present in the ellipsoidal molecular structure of $C_{70}$.

FIG. 5C-D are a series of images depicting electronic and vibrational spectroscopy of $C_{60}$ and $C_{70}$ nano-fullerite films: (C) The FTIR spectrum of $C_{60}$ (top) and $C_{70}$ nano-fullerites (bottom). The peak appearing at $\approx 632$ cm$^{-1}$ in each spectrum is due to substrate absorption whose broad range (400 cm$^{-1}$-4000 cm$^{-1}$) spectrum is provided in FIG. 6 below. (D) The Raman scattering spectrum of $C_{60}$ (top) and $C_{70}$ nano-fullerites (bottom) measured at an excitation wavelength of $\approx 514.5$ nm. Vibrational peaks identified and assigned are highlighted by marking them in FTIR and Raman spectra.

Low intensity peaks appearing at wavenumbers≈2400 and ≈3000 cm$^{-1}$ in both materials are possible due to presence of any residual solvent or dispersant.

Figure 7:
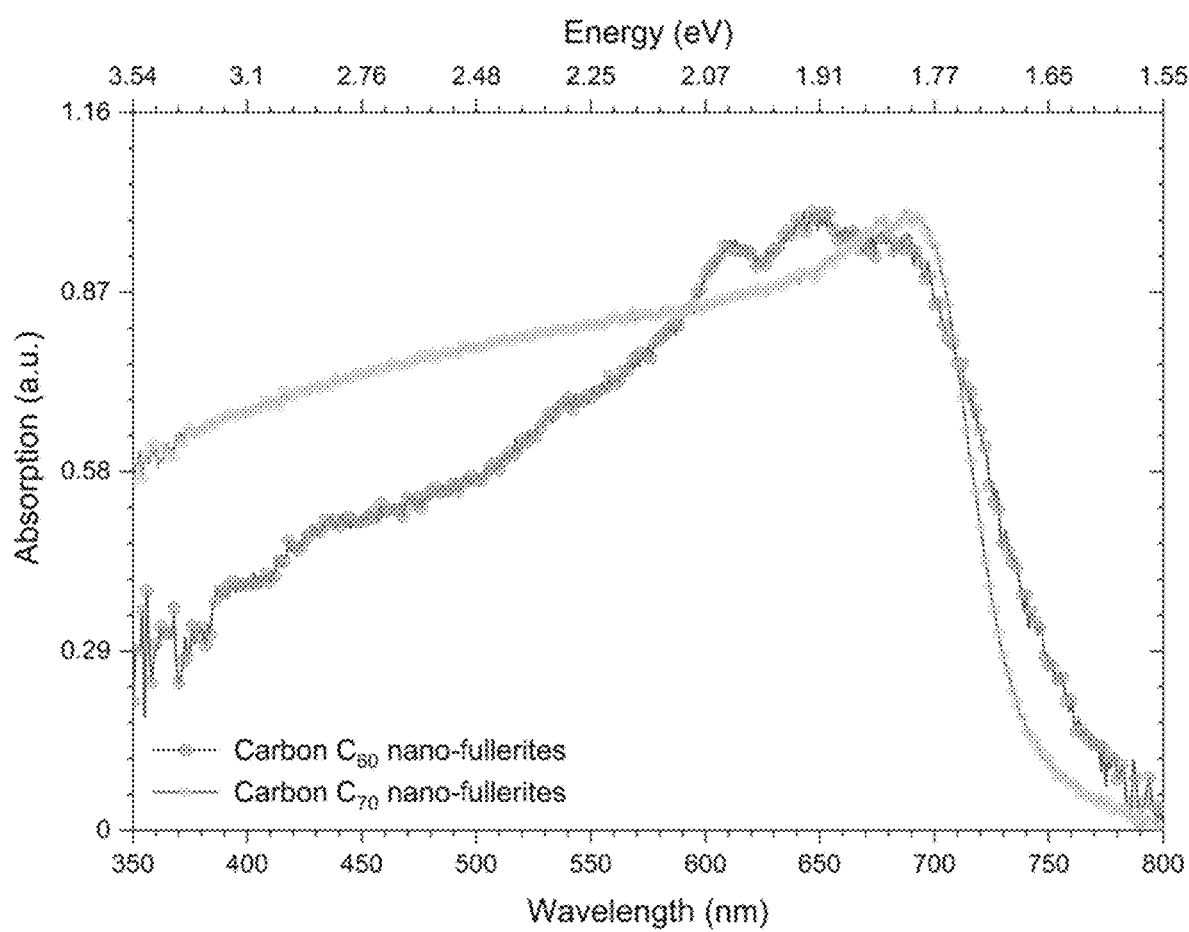

FIG. 7 is a graph depicting absorption spectroscopy of nano-fullerite films. Optical absorption spectra of $C_{60}$ and $C_{70}$ nano-fullerites films display their semiconducting nature. Both materials absorb light covering the whole visible spectrum.

Figure 8:
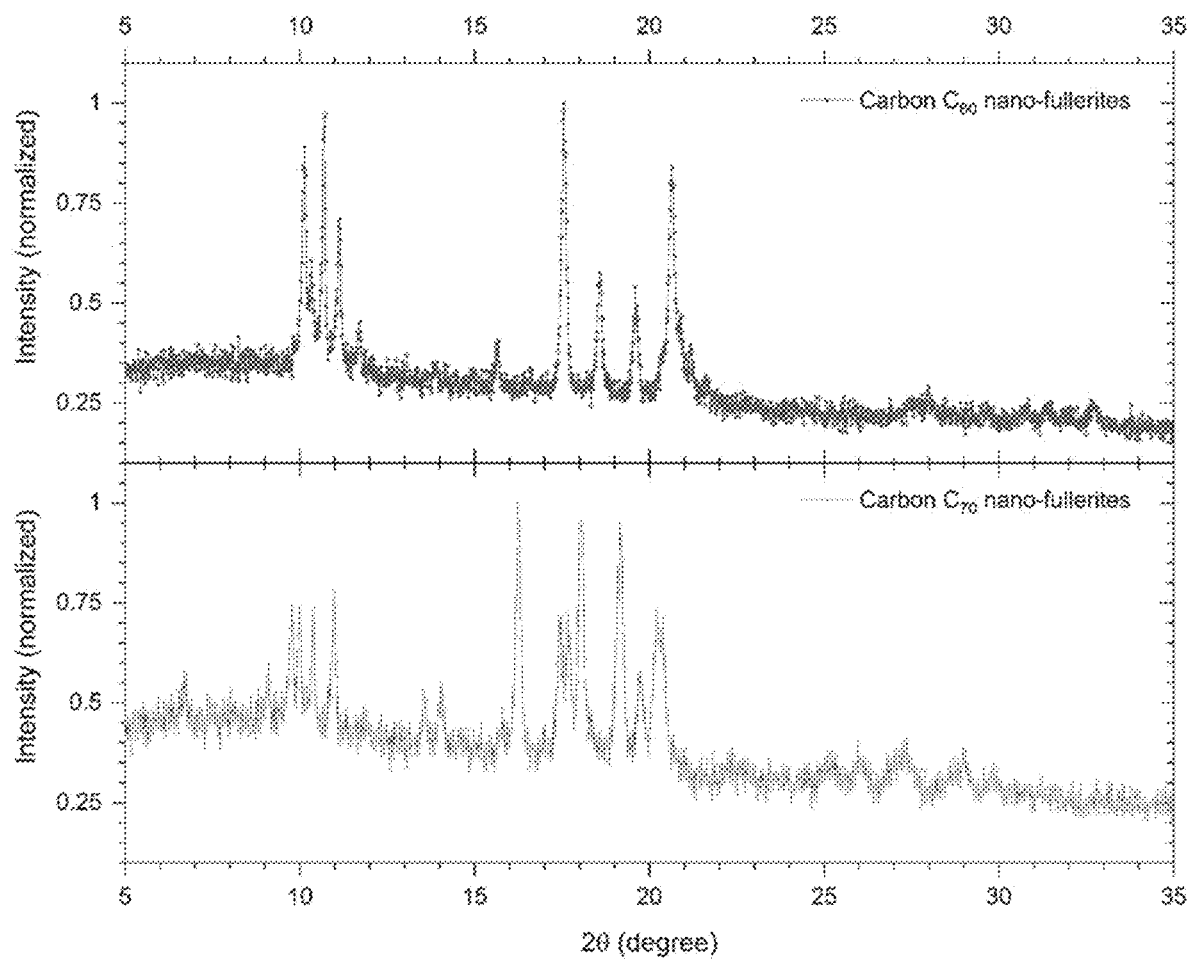

FIG. 8 is a graph depicting X-ray spectroscopy of nano-fullerite films. X-ray diffraction spectrum of $C_{60}$ and $C_{70}$ nano-fullerite films. Crystal structure of these materials is known to change depending on their growth history. Spectra measured on films of aged pellet partially matches with the International Centre for Diffraction Data (ICDD) reference code: 01-082-0505 (cubic) and 00-047-0787 (hexagonal) for $C_{60}$; and 01-073-9761 (orthorhombic) and 00-048-1449 (rhombohedral) for $C_{70}$.

Figure 9:
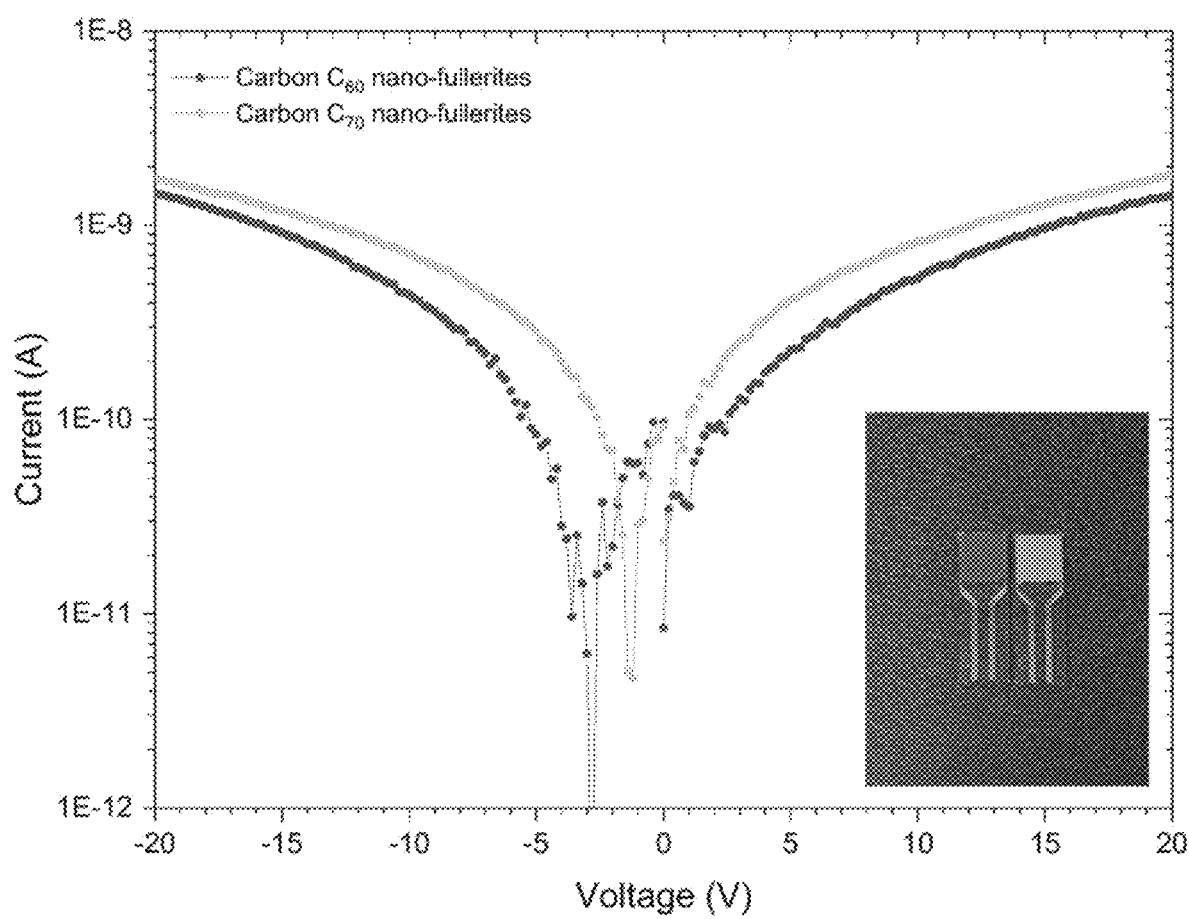

FIG. 9 is a graph depicting electrical characteristic of nano-fullerite films. Current-voltage characteristics of $C_{60}$ and $C_{70}$ nano-fullerite films measured via depositing films on large-area interdigitated gold electrodes (inset to the figure). Water droplet placed on these films have on effect on conductivity of the films.

FIG. 10A-I is a series of images depicting surface wetting characterization and water droplet dynamics on $C_{60}$ and $C_{70}$ nano-fullerite films. (A,B) 2D images are goniometry snapshots (side-view) showing a sessile water droplet on superhydrophobic surfaces of $C_{60}$ and $C_{70}$ films, respectively. (C) Snapshot (top-view) of a water droplet rolling on a tilted $C_{60}$ film (diameter ≈6 mm). The silver color seen at the droplet-surface interface is due to the plastron effect. (D) Image sequence showing droplet-surface interface dynamics during advancing and receding movements of the needle with a droplet suspended at its front revealing a non-wetting interface. (E) High-speed time frames of a water droplet bouncing on a $C_{70}$ film. (F) Sessile droplet on $C_{70}$ deposit when interfaced with a hydrophilic glass surface is transferred without any loss of water (top image sequence, 1-3). Sessile droplet interfaced with another $C_{70}$ deposit display extreme water repellency, even with the increase in pressure droplet remains squeezed between the surfaces without any impalement (bottom image sequence, 1-4). The droplet under this condition is observed to remain stable in its Cassie state for a period of 2 min and repeated press. (G) Column sequence display supercooling of a sessile water droplet to freeze on a $C_{70}$ film. h) Subsequent melting behavior of the droplet. The droplet is seen completely transferred to the underneath glass surface. i) Time lapse snapshots of an evaporation water droplet. The droplet maintains θ*>150° for ≈14 min during its lifecycle.

Figure 11:
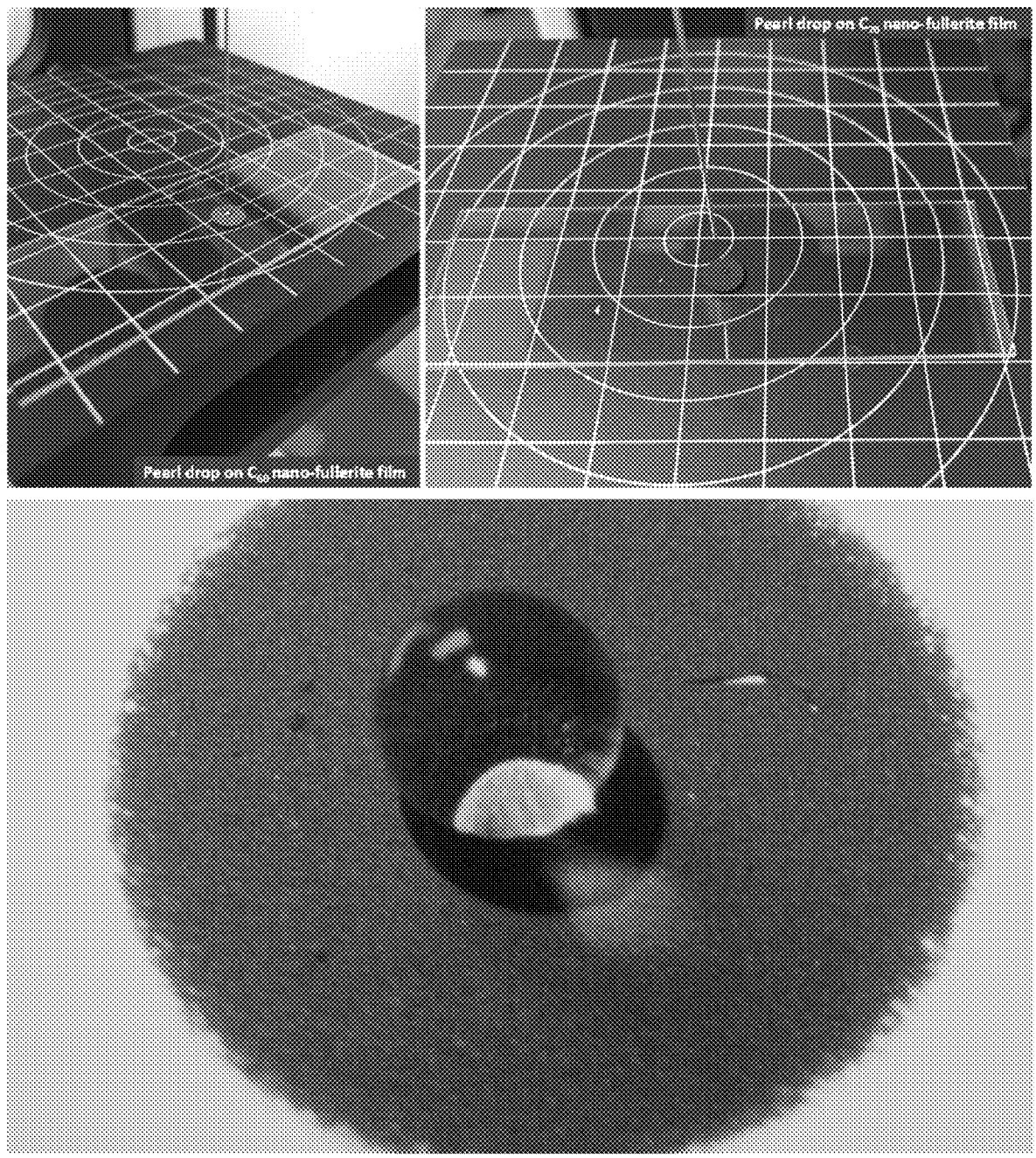

FIG. 11 is a series of images depicting a pearl drop on nano-fullerite films. Photographs show $C_{60}$ film (top left) and $C_{70}$ film (top right) deposited on glass slide from their colloidal gels. Water droplet with different volume is placed on these films via the needle front. The droplets look like a pearl resting on the films as they in the Fakir state. Photographs can be zoomed in for magnified view of the droplet on these films. False colored goniometry snapshot (bottom) reveals air trapped between the droplet and the surface (the plastron effect).

FIG. 12A-C are a series of images depicting smooth and rough nano-fullerite surfaces. (A) Photograph of a silicon substrate coated with $C_{60}$ nano-fullerite film. This film has two different surface roughness that leads to wetting and non-wetting behavior. Smooth surface is achieved via by whisking aged pellet continuously and followed by creation of a rough surface by scrapping the smooth surface from top and sides after film is formed. (B) Low magnification SEM image shows resulting surface morphologies. (C) Photograph of substrate dipped in water displaying that only rough surface is shielded by a protective layer of air that keeps the film dry underwater whilst the smooth surface wets.

FIG. 13A-B are a series of images depicting superhydrophobic and hydrophilic surfaces. (A) Photograph of a large-area $C_{60}$ nano-fullerite deposit prepared using aged pellet on a glass slide demonstrating that the resulting surface is superhydrophobic. (B) In contrast, the smooth surface of $C_{60}$ nano-fullerite display a hydrophilic behavior. The photograph is taken just after the droplet is placed, within few seconds the droplet further spreads on this surface. Magnified SEM images of this wettable surface are shown in FIGS. 14A and B.

FIG. 14A-B are a series of images depicting wettable nano-fullerite surface morphology. (A and B) Magnified SEM images of smooth $C_{60}$ nano-fullerite surface shown in FIG. 12B. This surface is hydrophilic, a water droplet spreads on this surface (see FIG. 13B). The 3D surface plot, FFT, line scan and PSD plot of this surface are shown in FIG. 18A, and FIGS. 19A and D respectively.

FIG. 15A-D are a series of images depicting non-wettable nano-fullerite surface morphology. (A) SEM image showing emergence of a random rough surface after scrapping the nominally smooth surface of the $C_{60}$ nano-fullerite film. Agglomerated cluster structure of nano-fullerites are observed. (B), (C) and (D) Surface images acquired at different magnification on the same spot highlighted as square box in the images. The 3D surface plot, FFT, line scan and PSD plot of this surface are shown in FIG. 18B, and FIGS. 19B and E respectively.

FIG. 16A-B are a series of images depicting wettability of a fresh and an aged pellet deposit. (A) Photograph shows a silicon substrate dipped in water with random deposits of $C_{70}$ nano-fullerite from an aged and a fresh pellet. Fresh pellet deposit surface does not display underwater air plastron formation (silver appearance when immersed and viewed at glancing angle in water) while the whole aged pellet deposit remains dry underwater. (B) High resolution SEM image of the whole $C_{70}$ nano-fullerite random deposit. Magnified SEM images of this surface are shown in FIG. 17A-B.

FIG. 17A-B are a series of images depicting agglomerated clusters of nano-fullerites. (A and B) Agglomerated clustered structure which are formed due to centrifugation and aging of the pellet. This surface is superhydrophobic. Air pocket at different length and depth scales are also observable suggesting surface has a multiscale roughness. These are magnified images of the $C_{70}$ nano-fullerite deposit shown in FIG. 16B.

FIG. 18A-C are a series of images depicting 3D Surface Plots and FFT pattern. The 3D surface plots show typical morphology and variations in height along x, y and z coordinates (relative): for (A) nominally smooth surface (wettable) (B) abrasion on nominally smooth surface, (non-wettable) and (C) surface formed of agglomerated clusters (non-wettable). FFT of the surfaces is also shown alongside displaying the variation in intensity spot and space occupied. Their line scan profile plot and PSD are shown in FIG. 19.

FIG. 19A-F are a series of line scans and power spectral density plots. The single line scan surface roughness profile plots for surfaces morphology shown in FIG. 18. (A) wettable surface (B) non-wettable surface (C) non-wettable surface. (D, E and F) PSD plots of respective surfaces, solid lines are fit to the data using the self-affine models.

Figure 20:
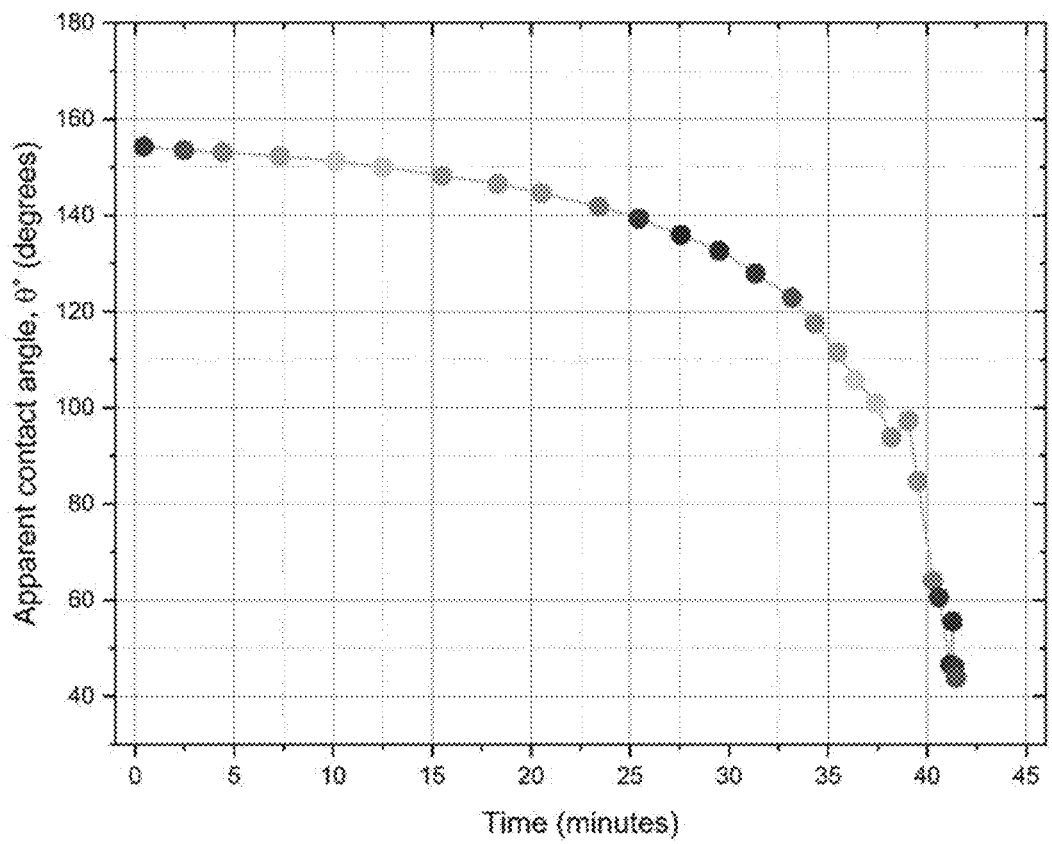

FIG. 20 is a graph depicting the longevity of droplet's superhydrophobic state. The graph shows the change in apparent contact angle with time for an evaporating water droplet under ambient conditions. The contact angle gradually decreases over time due to Laplace pressure. The droplet sustains $\theta^* > 150°$ up to 14 minutes.

FIG. 21A-B are a series of graphs depicting the Cassie model and wetting diagram: (A) Modeled plot for an ideal Cassie droplet demonstrates relationship between solid surface fraction ($\phi_s$) and apparent contact angle ($\theta^*$) for typical values of materials intrinsic Young's contact angle ($\theta_Y$). The parameter $\theta_Y$ is varied from 0° to 120° which the theoretical maximum possible angle on a smooth surface. The shaded region represents superhydrophobic zone ($\theta^* > 150°$). Model predicts that any rough surface providing $\phi_s \leq 6\%$ can be made superhydrophobic, $\theta_Y$ or the materials surface energy is not essentially a limiting factor. The bold black curve represents smooth fullerite surface ($\theta_Y = 60°$) which approaches $\theta^* = 150°$ for $\phi_s \approx 9\%$. For the measured $\theta^* \approx 155° \pm 3°$ water droplet only contact's $\approx 5$-$8\%$ of the nano-fullerite surface. (B) Wetting diagram shows change in apparent contact angle ($\theta^*$) for an evaporating water droplet signifying how droplets wet the surface. The droplet maintains $\theta^* > 150°$ for $\approx 14$ min in a Cassie state (black solid and dash-dot line) with a very low percent of $\phi_s$. The fraction $\phi_s$ reduces with time as droplets starts to wet the surface, slowly making a transition to the Wenzel state. The blue dotted line crossing quadrant III to I represents the Wenzel model.

FIG. 22A-L are a series of images depicting non-wettability and plastron effect: (A) Millimetric sized water droplets placed on superhydrophobic surface of nano-fullerite films deposited on a hydrophilic glass slide. (B) The photograph shows a $C_{70}$ film (diameter $\approx 6$ mm) deposited at the center of metallic substrate placed in a Petri dish. Water is poured from side to wet the surface; films display extreme resistance to wetting. (C) $C_{70}$ film deposited at the edge of silicon wafer; the film displays water repellency even under continuous running water flow. (D) Photograph showing water droplets placed on the leaves of *Loropetalum chinense*. (E) A branch of plant dipped in a glass of water. Leaves of this plant appear silver underwater due to the plastron effect. (F-G) *Ephydra hians* of California's Mono Lake. This fly not only forms highly stable plastron covering its whole body except its eyes but can also trap air in the form of bubble underwater. Reproduced with permission: copyright Floris van Breugel. (H) Plastron effect displayed by $C_{70}$ nano-fullerite deposited using colloidal gel that mimics superhydrophobic surfaces of plants and biological species. (I) Colloidal gel deposited on the surface of a deceased cockroach displaying plastron effect underwater. (J) Air bubble captured by $C_{70}$ nano-fullerite film underwater imitating the air bubble formed by the alkali fly of Mono Lake. (K, L) Large-area superhydrophobic coatings pasted using gels on glass slide (dimension $\approx 12.5$ mm$\times 12.5$ mm). As seen in the photographs these surfaces can even sustain multiple acidic and alkaline droplets.

FIG. 23A-C are a series of images depicting water droplet adhesion on nano-fullerite film. (A) Photograph shows a tiny water droplet held vertically on a $C_{70}$ nano-fullerite film deposited on glass slide demonstrating strong adhesive behavior of the film. This peculiar sticky behavior typically referred to as the gecko effect have been observed previously on few superhydrophobic surfaces and is attributed to dense packing of nanostructures that enhances the van de Waal's forces as the droplet comes in close contact with a large surface area. (B) Goniometry snapshot of a water droplet resting on a superhydrophobic nano-fullerite film. (C) The glass slide is then turned upside down. The droplet is observed to remain held onto surface. Note the difference in the droplet base reflection on glass in Fig. B and C.

FIG. 24A-C is a series of images depicting plastron effect on nano-fullerite films. (A) Random deposit of $C_{70}$ nano-fullerites on glass slide which is dipped in water. (B) When the deposit is seen from certain glancing angles or the glass slide is rotated, air trapped on the surface in the form of plastron is seen. The appearance of silver color is due to the total internal reflection that occurs when light travelling in a transparent medium with a refractive index of $n_1$ encounters an interface with a medium having lower refractive index, $n_2$. Total internal reflection depends upon the refractive index of both mediums and the angle of incidence. These parameters determine the glancing or the critical angle for the interface as, $\theta_c = \sin^{-1} \frac{n_2}{n_1}$. The light is completely reflected for all angles of incidence greater than this critical angle. The value of critical angle for a water-air interface is 49°, where $n_2 = 1$ and $n_1 = 1.334$. (C) Nano-fullerite deposits display very stable air plastron even when the fresh water is replaced by highly alkaline (pH 10) solution having high concentration of $Na_2CO_3$ like the alkali fly of the Mono Lake.

FIG. 25A-C is a series of images depicting the wettability of *Loropetalum chinense*. (A) Branch of the plant. (B) branch of plant immersed in water immersed in water displaying plastron effect. (C) water droplets placed on plants leaves.

FIG. 26 is a series of images depicting nano-fullerite coating on a cockroach. SEM images shows $C_{70}$ nano-fullerites randomly deposited over body of a deceased cockroach. Inset to the top left SEM image shows photograph of coated cockroach. When submerged in water the coating comes off due to expansion of body parts as seen in the photograph shown in inset to the top right SEM image. However, where the nano-fullerite coating is sustained it display the plastron effect.

FIG. 27A-D are a series of images depicting non-wettable nano-fullerite film. Experimental demonstration of non-wettability and water repellency displayed by the nano-fullerite deposit from colloidal gel. (A) Photograph shows a $C_{70}$ nano-fullerite film deposited at the center of nanostructured aluminum surface. (B) The film stays dry underwater exhibiting the plastron effect. (C) The film also displays extreme water repellency when water is flown from sides. (D) The film also sustain plastron when at a water depth of two feet for three hours.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supersedes any disclosure of an incorporated publication to the extent there is a contradiction.

As used in the specification and claims, the singular form "a", "an" and "the" include plural references unless the context clearly dictates otherwise.

As used herein, the term "comprising" is intended to mean that the products, systems and methods include the referenced components or steps, but not excluding others. "Consisting essentially of" when used to define products, systems and methods, shall mean excluding other components or steps of any essential significance. "Consisting of" shall mean excluding more than trace elements of other components or steps.

All numerical designations, including ranges, are approximations which are varied up or down by increments of 1.0 or 0.1, as appropriate. It is to be understood, even if it is not always explicitly stated that all numerical designations are preceded by the term "about".

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

The term "about" or "approximately" as used herein refers to being within an acceptable error range for the particular value as determined by one of ordinary skill in the art, which will depend in part on how the value is measured or determined. As used herein the term "about" refers to ±10% of the numerical.

The term "superhydrophobic" as used herein refers to surfaces that exhibit water contact angles >150° and contact angle hysteresis <10°.

The term "non wettable" as used herein refers to a surface that is not wetted by water drops in air or can sustain an air film under water. The non-wettable surfaces described herein have an increasing roughness amplitude (out-of-plane roughness) and enhanced correlation length (in-plane roughness).

The term "fullerenes" as used herein refers to a molecule containing an even number of carbon atoms arranged in a closed hollow cage. Fullerenes may contain even numbers of carbon atoms totaling from 20 to 500 or more. Examples of fullerenes include, but are not limited to the following: $C_{20}$, $C_{32}$, $C_{36}$, $C_{48}$, $C_{60}$, $C_{62}$, $C_{70}$, $C_{72}$, $C_{74}$, $C_{76}$, $C_{78}$, $C_{80}$, $C_{82}$, $C_{84}$, $C_{88}$, $C_{90}$, $C_{94}$, $C_{110}$, $C_{120}$, $C_{140}$ and $C_{380}$. The fullerene may have 20 to 400 carbon atoms, 20 to 200 carbon atoms, 40 to 150 carbon atoms, or 60 to 100 carbon atoms.

In some embodiments, it is preferred that the fullerene has at least 60 carbons. In some embodiments, $C_{60}$, $C_{70}$, or a mixture thereof may be used to form the films and coatings disclosed herein.

The term "fullerites" as used herein refers to the solid crystalline form of a fullerene.

The term "aging" as used herein refers to storing or incubating the pellet of nanofullerites in the absence of any disturbance to allow gelling of the agglomerates to occur. In some embodiments, the time period in which the nanofullerites are aged is at least 3 weeks, In some embodiments, the nanofullerites may be aged for between 3 weeks to about 52 weeks, including all time periods in between to the day. In some embodiments, the nanofullerites are stored in the centrifugation tube, however other containers for storage are contemplated provided that the agglomerates of nanofullerites are in sufficient contact with one another to allow for gelation.

A long-standing quest in material science has been the development of non-wettable superhydrophobic films based on a single organic material, without the requirement of fluorination or silane treatment. Here, such films and coatings, which are developed using colloidal gels of fullerite $C_{60}$ and $C_{70}$ nanocrystals, are described. It is illustrated that despite the high surface energy of these van der Waals molecular crystals, their gelation can create films having self-affine fractal surfaces with multiscale roughness. Water droplets on resulting surfaces of fullerite films bead like a pearl resting in a Fakir state with contact angle exceeding 150°. The films are extremely water repellent and non-wettable; when submerged in water they stay dry up to 3 h even at a water depth of two feet and exhibit the plastron effect. A series of experiments are presented to provide comprehensive inspection of water droplet dynamics on these films. These include rolling, bouncing, squeezing, freezing, melting, evaporating; along with acidic and alkaline tests. Non-wettable films of such materials are unique as fullerites get photosensitized instantaneously generating extremely high yields (≈100%) of singlet oxygen ($^1O_2$) that can destroy viruses and bacteria, thereby enabling their use in rheology, water purification, and medicinal devices.

Materials and Methods

Fullerene powders ($C_{60}$ sublimed 99.9% Beantown Chemical Corporation, USA) and ($C_{70}$ 99%, Beantown Chemical Corporation), IPA (≥99.5%, VWR Chemicals BDH) carbon disulfide (anhydrous ≥99%, Sigma Aldrich), and pH buffer solutions (Thermo Scientific) were used as received. Antisolvent crystallization was used to grow fullerites. Factors that determined growth and shape of fullerites were discussed in the Sathish et al. and Geng et al. references, herein incorporated into this disclosure in their entireties. (M. Sathish, K. Miyazawa, J. P. Hill, K. Ariga, *J. Am. Chem. Soc.* 2009, 131, 6372; J. Geng, W. Zhou, P. Skelton, W. Yue, I. A. Kinloch, A. H. Windle, B. F. G. Johnson, *J. Am. Chem. Soc.* 2008, 130, 2527)

A ZEISS Ultra-55 scanning electron microscope was used of imaging operated at an accelerating voltage of 5 kV. A JEOL-1011 transmission microscope was used of TEM imaging. Samples were prepared on a carbon grid. A Malvern Panalytical's Zetasizer Nano ZS90 operating at 633 nm was used for measuring the size distribution via dynamic light scattering technique. Dilute colloid solutions of nanofullerites dispersed in IPA were prepared in disposable plastic cuvette for measurements. A Physical Electronics 5400 ESCA was used for X-ray photoelectron spectroscopy.

A Shimadzu IRSpirit Fourier transform infrared spectrophotometer was used for transmittance measurements.

A Renishaw RM 1000B Micro-Raman spectrometer was used for acquiring the Raman spectra. The optical absorption spectra of the films were measured using a Cary 500 UV-vis-NIR spectrophotometer. The electrical characteristics of the films were measured using a Keithley 2400 source meter. Surface wetting characterization was carried out using a goniometer (DataPhysics). In a typical experiment, circular films of diameter ≈5 mm were deposited on glass slides and dried using nitrogen blow. Millimeter-sized droplets (volume ≈3-6 µL) were placed on the films either gently from the dispensing system and were video recorded using a high-speed camera. The frames of the video (after the droplet achieve equilibrium state on the surface ≈30 s) were then analyzed to determine the water droplet contact angles via fitting the droplet profile using the elliptical method with baseline placed manually. The commercially available software package Gwyddion was used to obtain the PSD via analysis of surface SEM images, on the assumption that resulting numerical results and statistical information was independent of pixel resolution and particular scan size; and error associated the way in which software computed data. ImageJ software was used to obtain the 3D surface profile plots and line scans via image analysis.

Nano-fullerites were grown via sonication coupled crystallization protocol. Herein, carbon disulfide ($CS_2$) was chosen as a common solvent for both fullerenes in which $C_{60}$ and $C_{70}$ have solubility of ≈7.9 and ≈9.8 mg mL$^{-1}$, respectively. All organic solvents of fullerenes can be used to form colloidal gels. Exemplary solvents include, but are not limited to, aromatic solvents and halogenated hydrocarbons. Examples of solvents include, but are not limited to, toluene, xylenes, and dichlorobenzene. (R. S. Ruoff, D. S. Tse, R. Malhotra, D. C. Lorents, *J. Phys. Chem.* 1993, 97, 3379; N. Sivaraman, R. Dhamodaran, I. Kaliappan, T. G. Srinivasan, P. R. P. Vasudeva Rao, C. K. C. Mathews, *Fullerene Sci. Technol.* 1994, 2, 233). Dissolution of fullerene powders (30.5 mg) in $CS_2$ (5 mL) was carried out using a mini-vortexer operating at 2800 revolutions per minute (rpm) for 7 min. The resulting concentrated solutions (6.1 mg mL$^{-1}$) were then rapidly injected into glass vials containing isopropyl alcohol (10 mL), kept under continuous sonication at a frequency of 35 kHz. Isopropyl alcohol (IPA) here acts as an antisolvent in which both fullerenes have a low solubility of ≈2.1 µg mL$^{-1}$. All other alcohols can also be used as antisolvents. Exemplary antisolvents include, but are not limited to, methanol, and butanol. The liquid-liquid interface (volume ratio 1:2) results in phase separation of fullerenes which is noticeable by the appearance of brown ($C_{60}$) and black ($C_{70}$) colloids. After 20 min of sonication more alcohol (5 mL) was added to colloidal solutions and vortexed for 3 min. Solutions were then left undisturbed for 15 min to allow the colloids to settle down, followed by decanting of the supernatant. This mixing and washing process was repeated several times until the supernatant appeared clear—redispersion left with a suspension of colloids (nano-fullerites).

Results and Discussion

Photographs 1-4 presented in FIG. 1A illustrates the entire growth protocol in sequence along with the resulting product obtained at each step. The transmission electron microscopy (TEM) and scanning electron microscopy (SEM) images of obtained nano-fullerites are presented in FIG. 1B-C, respectively. Lattice fringes of $C_{60}$ and $C_{70}$ can be seen in high-resolution microscopy images revealing a highly ordered long-range molecular arrangement in both carbon crystallites, FIG. 1B (middle). Reflection spots observed in the fast Fourier transform (FFT) pattern of the respective microscopy images represent the symmetry of respective lattice fringes, FIG. 1B (right). As seen in the magnified SEM images (FIG. 1C), $C_{60}$ crystals exhibit an elongated/platy flat-bladed crystal habit whilst $C_{70}$ crystallized in a globular/spherical habit. Insets to FIG. 1C are the intensity weighted size distribution profiles of nano-fullerites measured via the dynamic light scattering technique. The Z-average was found to be ≈906.2 and ≈537.3 nm; and a polydispersity index of 0.44 and 0.12, for $C_{60}$ and $C_{70}$ respectively.

To develop solution-cast films, well dispersed nano-fullerite solutions (1-1.5 mg mL$^{-1}$) were prepared following the washing process (photograph 5, FIG. 1A).

These colloidal solutions were filled in conical-bottom centrifuge tubes and were subsequently centrifuged at 3000 rpm for 5 min. The centrifugal force separates nano-fullerite from dispersant enabling them to sediment at the bottom (pellet) of the tubes (photograph 6, FIG. 1A). The pellets were kept in tubes for a minimum of 3 weeks, this allowed densely packed nano-fullerites to further agglomerate to gel. The photograph presented in FIG. 1D shows a few micrometer thin fullerene films of $C_{60}$ and $C_{70}$ deposited on glass slides via drop-cast from their colloidal gels. This solution-based scheme contrasts the conventional approach to produce fullerite films which are deposited by sublimation of fullerene powder (photograph 1, FIG. 1A) at high temperature (≈450° C.) under high-vacuum conditions (≈10-6 Torr), thus offering an alternative route to produce nanostructured films. Large-area SEM images and TEM images of $C_{60}$ and $C_{70}$ are provided in FIGS. 2 and 3.

Figure 4:
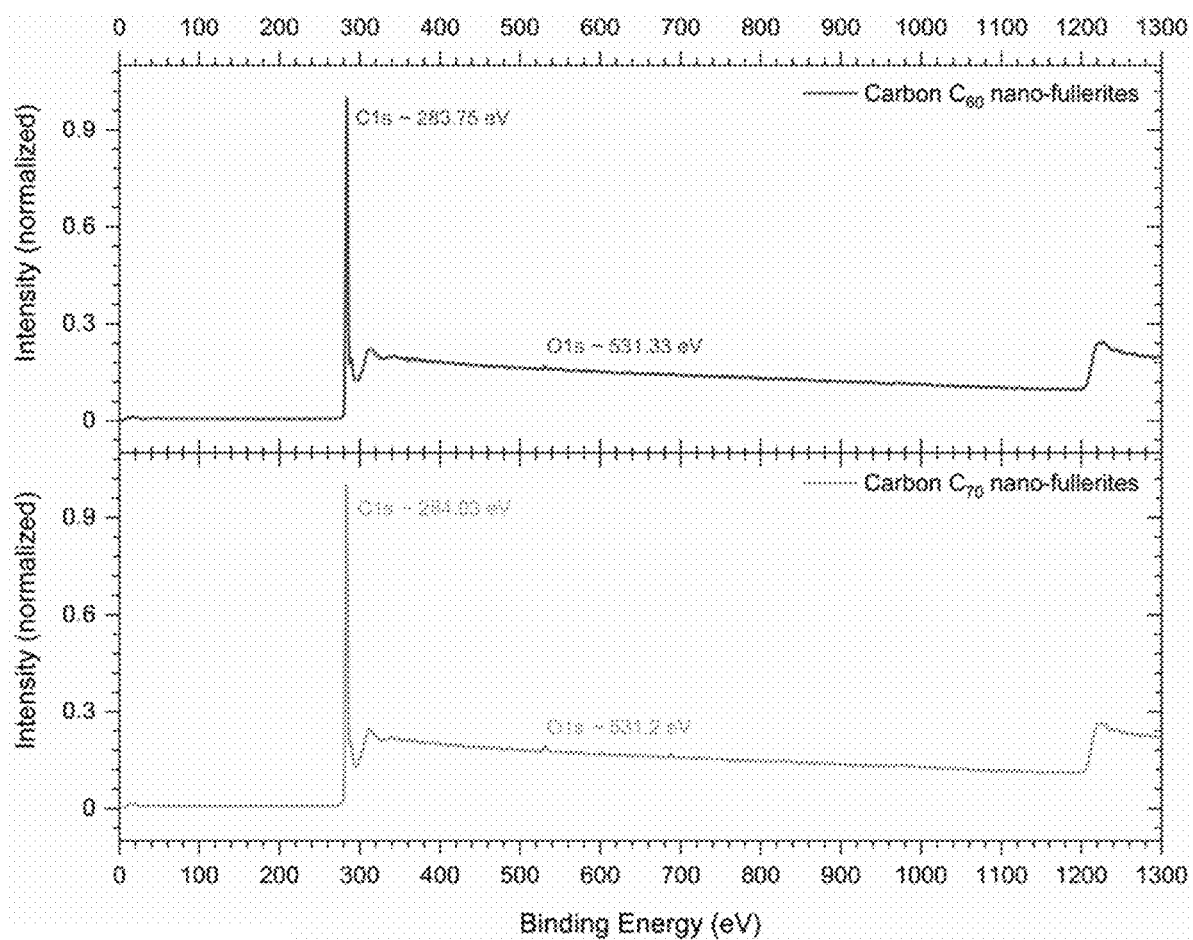
FIG. 4 is a series of graphs depicting photoelectron spectroscopy of nano-fullerite films. X-ray photoemission survey spectrum of $C_{60}$ and $C_{70}$ nano-fullerites taken at an energy of $\approx 1486.7$ eV reveals presence of oxygen O is peak in both materials located at binding energy of $\approx 531.33$ eV ($C_{60}$) and $\approx 531.2$ eV ($C_{70}$), along with the C 1s core peak at $\approx 283.75$ eV ($C_{60}$) and $\approx 284.03$ eV ($C_{70}$). The presence of oxygen is due to photosensitization of nano-fullerites films in presence air and visible light. The amount of oxygen estimated from the binding energy intensity is $\approx 0.89\%$ (at %) and $\approx 1.01\%$ (at %) and carbon content of $C_{60} \approx 99.11\%$ (at %) and $C_{70} \approx 98.99\%$ (at %).

Surface chemical inspection of the films done via the X-ray photoelectron spectroscopy reveals presence of low intensity oxygen peak (O 1s) located at binding energy of ≈531.33 eV ($C_{60}$) and ≈531.2 eV ($C_{70}$) as films are prepared in air, FIG. 4. The carbon core line (C 1s) in both materials is symmetric and has a Gaussian nature with a full width at half maximum (FWHM) of ≈0.75 eV for $C_{60}$ and ≈0.77 eV for $C_{70}$ (resolution limited), FIG. 5A-B. The core line of $C_{60}$ is ≈280 meV shifted toward the higher binding energy relative to $C_{70}$ peaking at ≈283.75 eV. For both carbon materials, the distinct energy positions of their camelback-like satellite features referenced to their C is core line can be seen in FIG. 5a,b. The first prominent peak observed at binding energy of ≈1.85 eV ($C_{60}$) and ≈2.53 eV ($C_{70}$) are due to direct electron transition from the highest occupied band to the lowest unoccupied band. (J. H. Weaver, J. L. Martins, T. Komeda, Y. Chen, T. R. Ohno, G. H. Kroll, N. Troullier, R. E. Haufler, R. E. Smalley, *Phys. Rev. Lett.* 1991, 66, 1741; B. Han, L. Yu, K. Hevesi, G. Gensterblum, P. Rudolf, J. Pireaux, P. A. Thiry, R. Caudano, P. Lambin, A. A. Lucas, *Phys. Rev. B* 1995, 51, 7179).

The purity of the films is further probed via analyzing the infrared (IR) and Raman active frequencies of their vibrational modes. $C_{60}$ molecule has icosahedral (Ih) point group symmetry (four IR active modes) and addition of ten carbon atoms lowers the symmetry of $C_{70}$ molecule to ($D_{5h}$) symmetry [insets to FIG. 5A-B], resulting in a higher number of vibrational frequencies (thirty-one modes).

The Fourier transform infrared (FTIR) absorption spectrum of $C_{60}$ display all four modes associated with the radial [$F_{1u}(1)$≈527 cm$^{-1}$ and $F_{1u}(2)$≈576 cm$^{-1}$], and with the tangential [$F_{1u}(3)$≈1182 cm$^{-1}$ and $F_{1u}(4)$≈1429 cm$^{-1}$] motion of carbon atoms, FIG. 5C. For $C_{70}$, within the frequency range of 500-1500 cm$^{-1}$ eighteen peaks are identified. The inventors have assigned these peaks based on previously calculated vibrational frequencies using density functional theory (DFT). (V. Schettino, M. Pagliai, G. Cardini, *J. Phys. Chem. A* 2002, 106, 1815). These include five $A_2''$ modes (564, 897, 1134, 1205, 1460 $cm^{-1}$) and thirteen $E_1'$ modes (535, 578, 642, 673, 795, 1087, 1179, 1251, 1292, 1320, 1415, 1428, 1490 $cm^{-1}$), FIG. 5C.

Figure 6:
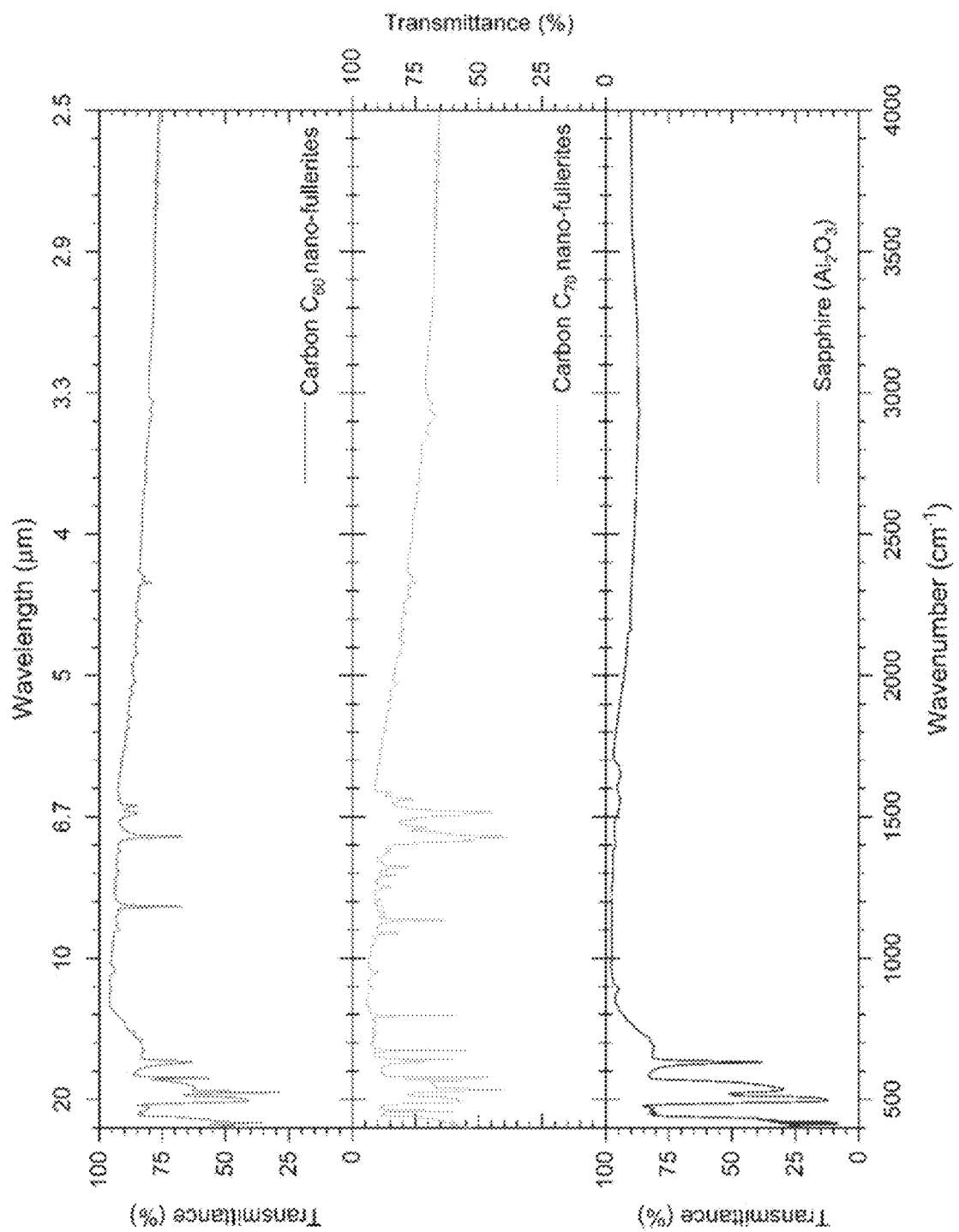
FIG. 6 is a series of graphs depicting vibrational spectroscopy of nano-fullerite films. Broad range FTIR spectrum of $C_{60}$ (top), $C_{70}$ nano-fullerites (middle) and sapphire substrate (bottom) on which films were deposited. Note that the peak appearing in both the spectrum of nano-fullerites in FIG. 5C at $\approx 632$ cm$^{-1}$ is due to substrate ($Al_2O_3$) absorption.

The Raman active frequencies of $C_{60}$ corresponding to the two Ag and five out of the eight Hg symmetries are observed in the scattering spectrum. The tangential "pentagonal pinch" mode $A_g(2) \approx 1464$ $cm^{-1}$ is most prominent and $A_g(1)$ radial "breathing mode" is noticed at frequency of $\approx 491$ $cm^{-1}$, FIG. 5D. The other Raman bands $\approx 269$, $\approx 709$, $\approx 769$, $\approx 1420$, $\approx 1571$ $cm^{-1}$ are assigned to $H_g(1)$, $H_g(3)$, $H_g(4)$, $H_g(7)$, $H_g(8)$ modes, respectively. $C_{70}$ has fifty-three Raman active bands $(12A_1'+22E_1'+19E_1')$ and they all appear between the spectral range of 200-1600 $cm^{-1}$. The inventors have only assigned ten notable peaks based on theoretical and simulated data reported previously. (G. Sun, M. Kertesz, *J. Phys. Chem. A* 2002, 106, 6381). These include six $(A_1')$ bands [$\approx 701$, $\approx 1057$, $\approx 1182$, $\approx 1226.1$, $\approx 1443.7$, and $\approx 1562$ $cm^{-1}$], one $(E_2')$ band at $\approx 948$ $cm^{-1}$ and three $(E_1')$ bands [$\approx 251$, $\approx 737$, and $\approx 1511$ $cm^{-1}$], FIG. 5D. Electronic and vibrational spectroscopy indicates that molecular nature is preserved in nano-fullerites and they are essentially van der Waals bonded crystals. The broad-range FTIR spectrum is shown in FIG. 6. The optical absorption spectrum is depicted in FIG. 7. The X-ray diffraction spectrum is depicted in FIG. 8. The electrical characteristics of the films are provided in FIG. 9.

Figure 10:
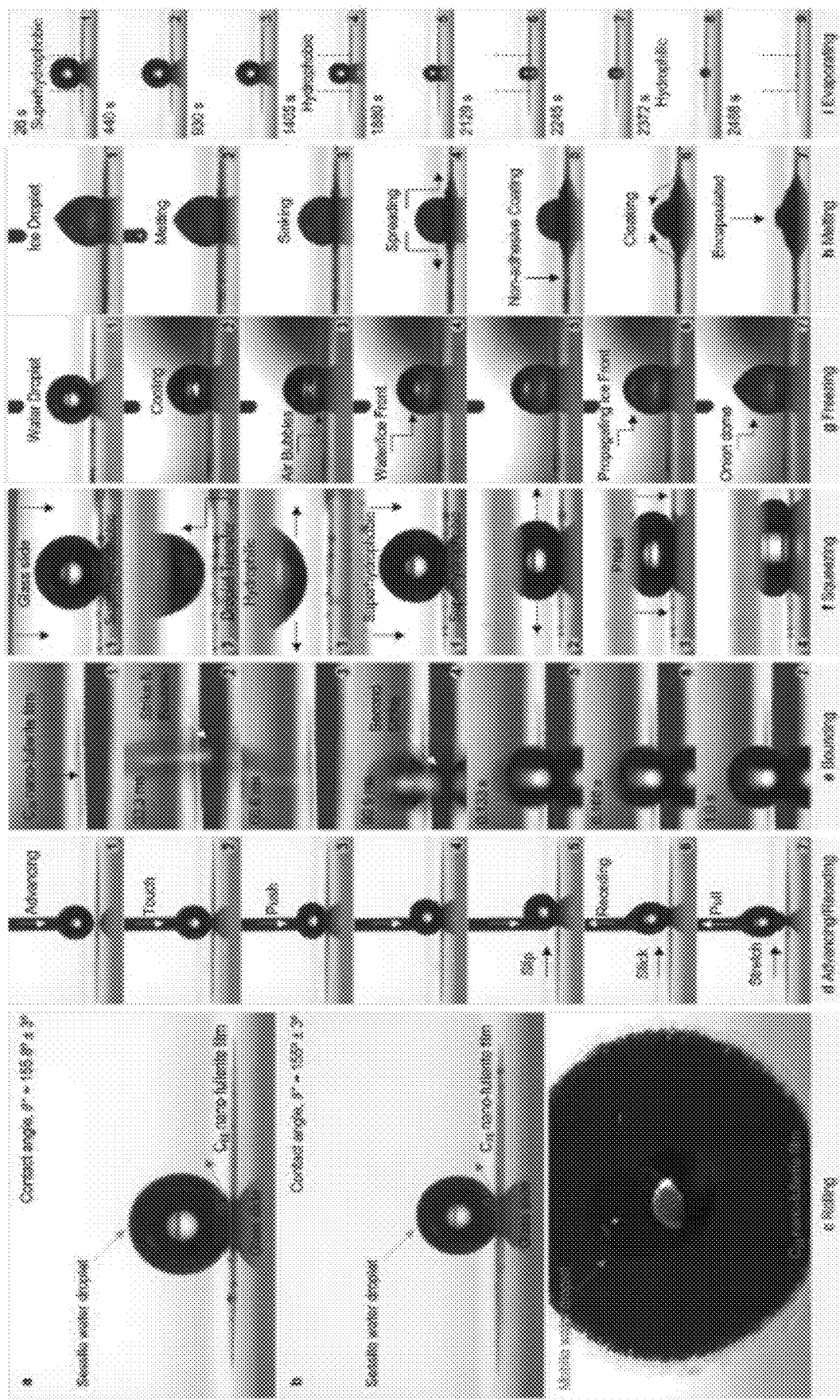

Unexpectedly, the inventors noticed that these nano-fullerite films exhibit superhydrophobicity. Using sessile droplet goniometry, the inventors determined water droplet contact angles which typically remained $\approx 150° \pm 6°$ even with variation in droplet volume and placement method. FIG. 10A-B is the goniometry snapshots of a droplet resting on horizontally placed glass slides coated with $C_{60}$ and $C_{70}$ film displaying a contact angle of $\approx 155.8°$ and $\approx 155°$, respectively. The error associated with contact angle measurement by manual baseline placement is $\pm 3°$. It should be noted that different mathematical models can be used for fitting the profile of a sessile droplet to determine the contact angle. These include circular, elliptical, tangent search, and Young-Laplace method. It is known that contact angle cannot exceed 156° under elliptical fitting, which the inventors have used. (X. Zhang, F. Shi, J. Niu, Y. Jiang, Z. Wang, *J. Mater. Chem.* 2008, 18, 621). Other methods used for fitting provide contact angles in a similar range however, the use of Young-Laplace method provides contact angles approaching $\approx 170°$ for 3-5 µL droplets. When placed on a slightly tilted substrate ($\approx 10°$) droplets slide-off from the surface of these films. Droplets resting on the film can roll-off if the substrate is tilted leisurely. A snapshot of a droplet captured while rolling that appears like a pearl (top view) is shown in FIG. 10C. (see also FIG. 11).

Experiments were undertaken to inspect the water droplet interface with $C_{60}$ and $C_{70}$ films, which revealed that the droplet does not make contact with their surface. In the image sequence shown in FIG. 10D, a droplet suspended from the needle is slowly advanced toward the film, and when it touches the surface does not detach from the needle. Advancing further downward, the droplet bulges and eventually moves away from its original position. As the needle is then gradually withdrawn, the droplet tends to stick to the surface and stretches. However, once sufficiently withdrawn completely detaches without wetting the surface. The time sequence images presented in FIG. 10E shows water droplet can even bounce-off from the surface. Here, a droplet from the needle front fixed at a height of $\approx 3.5$ cm from the film is released with soft vibration. FIG. 10E shows droplet dynamics captured within 1 s. As the droplet contact time with the surface is extremely short, the inventors were unable to captured dynamics shorter than $\approx 33$ ms. However, a footprint of the first strike and bounce in a blurry motion can be seen, as well as a subsequent low bounce on second strike before the droplet comes to rest with a contact angle of $\approx 143°$.

The image sequence in FIG. 10F shows the droplet interface with two surfaces, an identical superhydrophobic surface ($C_{70}$ deposit) and a hydrophilic surface (glass slide). As the glass slide approaches toward the droplet it instantaneously adheres to hydrophilic surface of glass and is completely transferred from the film without any loss of water, FIG. 10F (top image sequence, 1-3). When the droplet is pressed with another $C_{70}$ deposit, the droplet first moves between two surfaces as the initial force is applied on one side of the droplet, the contact angle hysteresis observed is less than 10°; with additional pressure the droplet starts to spread out and flatten, and can remain squeezed between both films without impalement, FIG. 10F (bottom image sequence, 1-4). Upon release of the pressure droplet nearly regains its original profile or if further work is applied the droplet bursts. These observed behaviors during surface interface experiments are signature features of a superhydrophobic surface.

Wetting of solids is principally governed by their surface energy and surface roughness. Water has a surface tension of $\approx 73$ mJ $m^{-2}$, its droplets are not able to spread fully on Teflon which has a low surface energy of $\approx 18$ mJ $m^{-2}$, in comparison fullerites have an energy per unit area of $\approx 43$ mJ $m^{-2}$. (X. Ma, B. Wigington, D. Bouchard, *Langmuir* 2010, 26, 11886). On a chemically homogeneous and smooth surface, droplet spreading is decided by the sign of spreading parameter, $S=\gamma SG-\gamma SL-\gamma LG$; where, $\gamma SG$, $\gamma SL$, $\gamma LG$ are the surface tension at the interface between solid-gas, solid-liquid, and liquid-gas, respectively. (D. Quéré, *Annu. Rev. Mater. Res.* 2008, 38, 71). For $S \geq 0$ droplet spreads, complete wetting occurs with zero contact angle or otherwise ($\gamma SG < \gamma SL + \gamma LG$) partial wetting will occur with a finite Young's contact angle ($\theta Y$) given by $\gamma LG\cos\theta Y=\gamma SG-\gamma SL$. For a smooth fullerite surface $\theta Y$ is 60°. However, nano-fullerite films are observed to significantly amplify this angle ($\approx 155° \pm 3°$) to an extent that droplets do not spread, instead beading up to have the appearance of a pearl. This unexpected enhancement in hydrophobicity is likely to originate due to the surface roughness of the films.

To understand how surface roughness influences contact angle, Wenzel and Cassie and Baxter gave hypotheses supported by mathematical expressions. (R. N. Wenzel, *Ind. Eng. Chem.* 1936, 28, 988; A. B. D. Cassie, S. Baxter, *Trans. Faraday Soc.* 1944, 40, 546). As per Wenzel, hydrophobicity is enhanced as roughness increases surface area, and the resulting change in contact angle is given by $\cos\theta^*=r\cos\theta Y$ where, $\theta^*$ is apparent or the measured contact angle due to roughness factor r (ratio of actual to apparent surface area >1). The use of the Wenzel model though is limited for $\theta Y>90°$, as for any values of $r>1$ and $\theta Y<90°$ it predicts that roughness will promote wetting.

The Cassie-Baxter model rests on the fact that rough surfaces entrap air, when a droplet is placed on them it sits on cushion of air ($\phi g$) contacting only the projected fraction of the solid surface ($\phi s$). On such a heterogeneous surface cosine of $\theta^*$ becomes weighted sum of contact angles of two homogeneous surfaces, air and the solid material as, $\cos\theta^*=-1+\phi s(1+\cos\theta Y)$. Trapped air between film's surface and the droplet is visually seen during goniometry surface interface experiments (see FIG. 10C). The Cassie-Baxter expression is therefore modeled to determine φg and the relationship of measured θ* up to theoretical maximum value of θY, FIG. 21A. As we see in the figure, for high percent values of φs the difference in θ* is significant for low and high Young's contact angles. However, as φs reduces the band of θY curves continue narrow approaching the superhydrophobic zone. This indicates that the decrease in φs lessen the contribution of θY or the materials surface energy. In fact, it diminishes the contribution of surface energy as this model predicts that θ*≥150° can be obtained even for surfaces with θY=0° provided that φs≤6%, however, for θY=120° this fraction is 20%. Fullerites (bold black curve) intersect with the vertical line on abscissa at measured θ*≈155° providing ordinate value of φs≈6%. Thus, the water droplets on the surfaces of the films rest on air (≈94%) in a Cassie or the Fakir state. It should be noted that surfaces of these films are not designed to achieve roughness with a low percent of φs. The traditional way to develop a superhydrophobic surface based on the Cassie-Baxter model involves design of a Fakir carpet—sub-micrometer level arrays of posts or pillars with well-defined geometry and intervals, surface roughness here is indeed definite and regular in all aspects. Such a single patterned structure usually made from high-surface-energy materials requires another coating of material with θY>90°. In contrast, roughness resulting from drop-casted fullerite films is random and irregular and will vary for each deposit—despite the fact that the resulting surface is still observed to be superhydrophobic. Therefore, to wholly explain superhydrophobic behavior of these films it is necessary to classify and characterize their surface roughness. An even more intriguing observation was that surface roughness resulting from assembly of freshly grown nano-fullerites (without centrifugation) or a deposit from fresh pellet (with centrifugation), both displays a completely opposite hydrophilic behavior. The inventors found that nano-fullerite films display θ*≈150° only if their pellets are "aged" over time.

The stark difference in wetting behavior of surfaces originates following centrifugation which essentially results in dense packing of nano-fullerites as a pellet. As nano-fullerites are kept in dispersant they are prone to form clusters, they can do so either via agglomeration (reversible) or aggregation (irreversible). The formation of clusters is not spontaneous but rather a time dependent process. Over time as the clusters grow their mass (number of nano-fullerites) and spatial dimension changes-they fill up available space until the volume occupied by clusters nearly equal to the total space. When this happens the pellet suddenly gels. The inventors noted that pellet must reach its gel point for films to display non-wettability.

Wettable and Non-Wettable Surfaces

Surfaces of fresh pellet deposit or a nominally smooth surface of nano-fullerite films are hydrophilic and wettable. Only surface roughness resulting from random deposits or films of $C_{60}$ and $C_{70}$ nano-fullerites prepared using aged pellets after gelation had occurred are observed to display droplet contact angles ≥150°. A gelled network of colloids is highly viscous medium that may feature agglomerates or clusters. The agglomerates observed in aged pellet are flat tile-like clusters (FIG. 14A and FIG. 17A). They essentially formed an aged pellet due to centrifugation wherein the nano-fullerites moves with force along the trajectory until they encounter a growing surface and stick to it. Aged pellets once disturbed by whisking (change in concentration and space) and kept again for some time tend to form additional grape-like cluster, in both cases building block of the cluster that is the individual nano-fullerite can be distinctly identified or they can be disintegrated i.e. they do not aggregate. Grape-like clusters can be observed in several goniometry snapshots and video files laying on top of the surface (not embedded).

The inventors demonstrated that surface roughness alone can lead to wettable and non-wettable surfaces. Smooth and rough surfaces were intentionally created. FIG. 12A shows a $C_{60}$ film deposited on a silicon substrate with two different surface morphologies. This $C_{60}$ film is formed via whisking an aged pellet intentionally such that when drop casted the individual nano-fullerite disintegrated from agglomerates by whisking form the top surface of the film. Nitrogen gun is then used to spread the gel uniformly. After the film is deposited, a part of it is removed from the substrate. Remaining film's top and side surface is scraped at different locations to uncover the agglomerates rough surface beneath it. SEM image of virgin film surface (nominally smooth) and scraped surface (rough) are shown in FIG. 12B. Substrate is then dipped in water, FIG. 12C. It is evident that underwater air plastron formation only takes place on the rough surface that emerges due to abrasion resulting from scraping while the rest of the surface is wetted.

Magnified images of wettable virgin surface are shown in FIGS. 14A and B. It can be seen that the surface is nominally smooth and flat with no large-scale indentation or asperities (bumps) present. This surface is still considered as rough, however, there is no significant variation in height or morphology over lateral distance relative to the scrapped surface, see FIG. 15A that features indentation, bumps and voids; even on several scales of observations as shown in SEM images acquired at different magnifications FIG. 15B-D. To quantify surface roughness of wettable and non-wettable morphology, the inventors obtained the power spectral density plots of both these surfaces which are shown in FIGS. 19D and E.

It should be noted that the deliberate abrasion on a film is created to demonstrate surface roughness induced two opposite wetting behavior on the same film. For the case of aged pellets following gelation a non-wetting surface roughness is inherent. As shown in photographs presented in FIG. 13A-B, surface roughness resulting from aged pellets display superhydrophobic behavior whilst water droplet spreads on a smooth surface. Similar behavior is also observed for the $C_{70}$ nano-fullerites. Photograph presented in FIG. 16A shows a silicon substrate dipped in water having a single large and several small random deposits of gelled $C_{70}$ nano-fullerites drop casted from aged pellet. The substrate also has a deposit of fresh pellet just after centrifugation. Here as well, plastron formation only takes places in aged pellets. Furthermore, the whole deposit is protected with air plastron despite significant variation in its morphology and the size of deposits. SEM image of the large deposit is shown is FIG. 16B. The drop cast is carried out without whisking the aged pellet. The magnified SEM images of the surface shows that nano-fullerite remain intact as agglomerated clusters, FIG. 17A-B. These experimental observations highlight that wetting of nano-fullerite films is governed by surface roughness not by their surface energy. Their gelation and formation of agglomerates provide a non-wetting roughness since the resulting surface roughness is random and irregular fractal geometry is used to characterize these surfaces.

Power Spectral Density Functions and Self-Affine Statistical Fractals

Once gelation is achieved it is not necessary to create films, surface of any random deposit from aged pellet results in θ*≈150° as a non-wetting roughness becomes inherent in the surfaces of gelled agglomerates. This is advantageous as the inventors demonstrated these gels can be randomly deposited on any platform and can be scaled up as pastes to develop large area superhydrophobic coatings. In colloidal science such agglomerated clusters and gels are known to have a fractally rough surface. (S. Lazzaria, L. Nicoud, B. Jaquet, M. Lattuadac, M. Morbidelli, *Adv. Colloid Interface Sci.* 2016, 235, 1; J. Teixeira, *J. Appl. Crystallogr.* 1988, 21, 781). Their fractal description is fundamentally important as the randomness of their surface roughness cannot be described by any geometrical shape and statistical description by conventional methods like root mean square roughness depends on scale of observation. To further investigate, if resulting surfaces are fractals and to differentiate between surface roughness of wettable and non-wettable nano-fullerite films, the inventors acquired and analyzed their surface roughness power spectral density (PSD) plots. Roughness spectra were analyzed by fitting the fractal models (self-affine and K-correlations models). (FIGS. 18 and 19).

Any deviation relative to an ideal smooth surface can be defined as roughness. Nearly all surfaces are rough at a certain magnified scale of observation. Fractal description of surfaces by self-similar and self-affine concepts acknowledges presence of roughness at all scales. Random rough surfaces resulting from drop casted colloidal gels or emergence of a randomly scraped surface can be treated as self-affine fractal. A self-affine fractal has the property that it appears the same following an affine transformation. For instance, if a small section of the object is magnified or stretched in different directions (perpendicular and parallel) with different ratios, the resulting enlarged object will look the same as the original object in a 'statistical sense'. For a surface roughness profile, this means that its height $h(x)$ scales differently than the lateral position (x) with a scaling function $h(\lambda x) \sim \lambda^H h(x)$, where H is roughness exponent or the Hurst exponent and $\lambda$ is the scaling factor. The value of Hurst exponent varies between $0<H<1$. If $H=1$, surface becomes self-similar. Such statistical description of a surface can be quantified by fitting the fractal models to the power spectral density (PSD) of surface profile data. Power spectrum essentially decomposes a surface into contributions from several spatial frequencies thus the variations of surface roughness in real space can be analyzed in frequency space. Typical characteristic of a self-affine surfaces is that its PSD [$\psi(f)$] is asymptotic or will display a power law behavior (fractal behavior) as $\psi(f) \sim f^{-\beta}$ where, $\beta$ is the spectral density exponent which is related to Hurst exponent as $H=(\beta \pm D)/2$, here, $D(1, 2$ or $3)$ is the Euclidean dimension. Fractal dimension ($D_f$) is related to Euclidean dimension as, $D_f=D+1-H$.

The inventors first examine and differentiate surface roughness via PSD analysis using fractal models then correlate PSD to wetting and non-wetting behavior. The 3-dimensional images presented in FIG. 18A-C display surface height variations of wettable and non-wettable surfaces discussed previously along with their fast Fourier transformed images. The single line scan profile plots for these surfaces are presented in FIG. 19A-C. The PSD plots of the respective surfaces are shown in FIG. 19E-F. Power spectrum is computed where every line height profiles that forms the image is Fourier transformed and averaged with arbitrary units.

Wettable Surface

Wettable surface: The PSD of wettable surface exhibits two different regimes, FIG. 19D. It is nearly constant (absence of correlation) covering a range from low to intermediate spatial frequencies beyond which at high frequencies it roll-off. This is a typical case for self-affine fractal wherein power law scales as $\psi(f) \sim f^{-\beta}$, and $\psi(f)$ ~constant such that it satisfies Lorentzian model, as:

$$\Psi(f) \sim \begin{cases} -(2H+1), & f \geq f_{roll-off} \\ \text{Constant}, & f < f_{roll-off} \end{cases} \quad (I)$$

The solid red line in FIG. 19D is Lorentz fit to the data. The physical interpretation of this distinct flattening of curve at respective spatial frequencies is that in real space dimensions there is no significant deviation in the value of roughness amplitude over a long distance. This is consistent with the 3D surface morphology shown in FIG. 18A. This nominally smooth surface still has roughness at a scale shorter than of the nano-fullerites which reflects the roll-off, beyond which PSD varies in a constant manner at a finite slope. The surface roughness can be characterized by measuring the slope via the liner linear fit regression. The inventors obtained $\beta=215$ and $H=0:57$. The exponent H describes the degree of surface irregularities at shorter length scales ($<\xi$) here, $\xi$ is the correlation length or the inverse of transition frequency (average distance between successive peak or valleys on the surface). The exponent, $\beta$ describes how surface roughness changes with length scale. For a constant variance at all values of (x), $\beta$ varies between $-1<\beta<1$ (fractional Gaussian noise) otherwise for self-affine fractal variance increases with (x) and $\beta$ varies between $1<\beta<3$ (fractional Brownian motion).

For the flat region that covers a broad range of frequencies, the slope $\beta \approx 0$ i.e. white noise, consistent with the line scan obtained, FIG. 19A.

Non-Wettable Surfaces

The flattening of PSD is absent for non-wettable surface roughness, FIG. 19E-F. Here, the roughness spectrum is correlated almost in the entire frequency range. These surfaces therefore cannot be accurately described as self-affine fractals since their PSD is not a straight line with a single slope. This is typical of real random surface; power law fractal relationship holds true only in a finite frequency range. The curve can be fitted with multiple power laws where linearity is preserved satisfying only the local slope or alternatively by K-correlation model, which is valid for self-affine surfaces, given by:

$$PSD = \frac{A}{\left(1+B^2 f^2\right)^{(C/2)}} \quad (II)$$

where parameters A, signifies the magnitude in the low frequency region with no notable variation in height, B signifies transition from the low frequency plateau region and C the slope for at high spatial frequencies. The solid lines in FIG. 19E-F are fitted to PSD using the K-correlation model. For the surface roughness resulting from abrasion of $C_{60}$ surface fit do not converge in the entire frequency range requiring a force fit. The range where the model fully converges is shown in green. In the high frequency range surface follows power law ($\beta=2.26$). For an aged pellet surface the K-correlation model fully converges for the entire spatial frequency range (black solid line) and power law fit in high frequency region provide $\beta=1.76$. Both these surfaces can also be fitted with two power law with a low coefficient of determination where linearity holds.

Correlation Between PSD Spectra and Wetting

There are no well-established mathematical expressions that incorporates self-affine surface parameters roughness amplitude a, roughness exponent H and correlation length ξ into the wetting models of Wenzel and Cassie-Baxter; attempts have been made by including fractal dimension to determine and experimentally validate measured contact angles. (Onda T, Shibuichi S, Satoh N, Tsujii K (1996) Super-Water-Repellent Fractal Surfaces. *Langmuir* 12(9): 2125-2127. PSD spectrum of leaves of lotus plant have also been compared with artificially created roughness of superhydrophobic surface. (Flemming M, Coriand L, Duparré A (2009) Ultra-hydrophobicity Through Stochastic Surface Roughness. *J Adhes. Sci. Technol.* 23(3):381-400). Theoretical and computational modelling often relate influence of self-affine surface parameter on Wenzel roughness factor which has revealed that wetting behavior is principally controlled by the Wenzel roughness factor r even when the droplet is in Cassie state. (Palasantzas G and De Hosson J. Th. M. (2001) Wetting on rough surfaces. *Acta mater.* 49 (2001): 3533-3538; T David R, Neumann AW (2012) Computation of the Wetting Properties of Randomly Structured Superhydrophobic Surfaces. *J. Phys. Chem. C* 116 (31): 16601-16608). This is where the PSD spectra analysis of the surface roughness becomes significant. It has been demonstrated that roughness parameters in the intermediate spatial frequencies (or wavelength) typically in the sub-micron range are more important. (Awada H et. al (2010) Correlation between Superhydrophobicity and the Power Spectral Density of Randomly Rough Surfaces. *Langmuir* 26 (23): 17798-17803). From the analysis, it cannot be concluded how self-affine surface parameters or their fractal-like surface influence contact angles but rather a clear distinction between wetting and non-wetting surface roughness is observed. For the case of nominally smooth wettable nano-fullerite surface, it is expected that the Wenzel roughness factor which is the ratio of actual to projected surface area should be close to ≈1. As this surface has no indentations or asperities that can cause an increase surface area (FIG. 14A) resulting in flat PSD across intermediate spatial frequencies, FIG. 19D. In this case, the apparent contact angle becomes equal to Youngs contact angle cos θ*=cos θ$_Y$ (i.e. r≈1) and the droplet spread on this surface. Simulations studies have shown that the roughness factor increases (r>1) with the increase in roughness amplitude (out-of-plane roughness) and increase in correlation length (in-plane roughness) that improves contact angle. (David R, Neumann AW (2012) Computation of the Wetting Properties of Randomly Structured Superhydrophobic Surfaces. *J. Phys. Chem. C* 116 (31):16601-16608). This is consistent with the PSD plots for non-wettable nano-fullerite surfaces. It can be seen the roughness amplitude increases continuously with a reduced slope with an enhanced correlation length, FIG. 19E-F.

From the examination of PSD plots, the inventors find that non-wettable surfaces have an increasing roughness amplitude (out-of-plane roughness) and enhanced correlation length (in-plane roughness). Furthermore, resulting surfaces are not perfect fractals, their power law behavior does not continue across all spatial frequencies instead representing two self-affine surfaces. Theoretically, it has been shown that it is not definite that fractal surfaces will induce non-wettability.[26] Only a certain class of self-affine fractal surfaces can induce non-wettability, even for material with 90°<θY>0°, if the asperities provide overhangs at least for the smallest indentations. Surface morphology inspection by high-resolution imaging at several magnifications revealed that surface formed of agglomerates of aged pellets have indentations with asperities at different scales of magnification (FIGS. 14 and 17). Accordingly, surfaces with self-affinity resulting from their gelation principally cause non-wettability of the films—essentially roughness is multiscale, a consequence of which is that films trap air at several length scales and depths of its thickness. A gelled network of agglomerates not only provides but also cements this roughness. Air trapping is not only favored on these surfaces but also maintained. The deeper air pockets within the indentations are largely isolated so air does not have a single channel to escape. Hence, collectively the surface develops a robust superhydrophobic roughness.

The effect of water droplet phase change on these superhydrophobic surfaces is examined by probing the dynamics of a supercooled water droplet and an evaporating water droplet. The column sequence in FIG. 10G-H shows icing and subsequent melting behavior of a droplet. For freezing the droplet, a dry ice (solid carbon dioxide) cooled plate is placed underneath the glass slide. Soon after, the droplet loses its Cassie state making a transition to the Wenzel state. As seen in FIG. 10G base radius of the droplet changes and it is in contact with the surface. Following which isolated air bubbles start to appear in the droplet due to separation of air dissolved in water as the new solid phase of water cannot accommodate air in their crystal lattice. The density of bubbles increases as the ice front propagates upward; however, the rising velocity of the bubbles is slower than that of the propagating ice front so they get trapped during the solidification process. The freezing front advances upward leading to solidification in an onion dome-like shape. The cold metal plate is then removed, and the frozen droplet is allowed to melt at room temperature. During melting, water penetrates the film and reaches the hydrophilic glass. This happens due to the droplet undergoing a Wenzel transition during freezing which facilitates water to fill the indentations and induce a pathway through the film to reach the substrate. Remarkably, film starts to cloak the sinking droplet and encapsulate it in its solid state. The droplet can be seen fully transferred and stored underneath the film on the glass surface, FIG. 10H. Such a functionality cannot be achieved on a rigid nano-micro textured superhydrophobic surfaces. Time lapse images in FIG. 10I shows sequence of an evaporating droplet under ambient condition. The droplet took ≈46 min to fully evaporate.

Contact angles were measured as a function of time, which were plotted in the wetting diagram (only θ*) to identify different wetting regimes, FIG. 21B. With an initial θ*≈154.3°, there is a gradual decrease in contact angle with time till it crosses from quadrant III to I to reach θ*≈44°. This decrease in θ* with time is attributed to simultaneous increase in the Laplace pressure P=2γ/R, (γ is the surface tension of water) which impel water into the surface. As the water droplet slowly evaporates, its radius decreases over time and therefore its radius of curvature (R) leading to an increase in pressure which leads to sag in the indentations enabling water to contact the surface. (P. Papadopoulos, L. Mammen, X. Deng, D. Vollmer, H.-J. Butt, *Proc. Natl. Acad. Sci. USA* 2013, 110, 3254). Once such nucleation points are established water can spread on the films slowly displacing air. In the wetting diagram transition (small bend) from the initial Cassie state to the Wenzel state (linear) can be seen. The droplet maintains θ*>150° for ≈14 min (FIG. 20), what is typically observed on designed Fakir carpets. (P. Papadopoulos, L. Mammen, X. Deng, D. Vollmer, H.-J. Butt, *Proc. Natl. Acad. Sci. USA* 2013, 110, 3254).

Millimetric-sized water droplet on nano-fullerite films deposited simply as a drop of gel can rest on them without penetrating or spreading in superhydrophobic state, FIG. 22A. These films are also observed to hold tiny droplet vertically and even when substrate is turned upside down (FIG. 23). To ascertain that films are non-wettable, they were tested under stationary and continuous flow of water over them from top and sides on a range of substrates. Extreme water repellency is displayed by these films. The photograph presented in FIG. 22B shows a nanofullerite film deposited at the center of a nanostructured metallic surface (aluminum). The substrate placed in a Petri dish is subsequently filled with water. Film stops water at its outer periphery forming a cavity, although the level of water is several orders of magnitude higher than the thickness of the film. Similar observation can be seen under running water where film halts the flow of water, here deposited on a silicon wafer, FIG. 22C. These films stay dry even when they are fully dipped in a pool of water repeatedly.

Superhydrophobic surfaces of many plant leaves and biological species display such non-wettability. As an example, the inventors show leaves of *Loropetalum chinense* (Chinese fringe). The photograph presented in FIG. 22D shows several water droplets placed on the leaves of the plant. When a branch of this plant is immersed in water both adaxial and abaxial surfaces of its leaves appear like a glistening silver mirror, FIG. 22E. The origin of silver appearance is a consequence of the total internal reflection occurring due to presence of air tapped between water and surface of leaves, collectively termed as the plastron effect (FIGS. 24 and 25). Plastron on these leaves is not stable, repeated immersion or agitation results in loss of plastron.

Few remarkable biological species like the *Ephydra hians* (Alkali fly) of California's Mono Lake forms highly stable plastron. The ancestors of this fly evolved in a very unique ecology. The water of Mono Lake is highly alkaline (pH 10), three times saltier than ocean water—no fish can survive here, the only other inhabitants found in lake are bacteria, algae, and tiny shrimp. However, the lake is home to trillions of alkali flies. To survive in the lake, they not only form a thin layer of plastron covering their face and legs but form a large air bubble around its superhydrophobic cuticle, FIGS. 22F and G. The fly uses the air bubble like a submarine, which enables it to crawl under water up to 15 min at a water depth of few meters. Floris van Breugel and Michael H. Dickinson recently studied adaptation of the alkali fly to Mono Lake in detail. (F. van Breugel, M. H. Dickinson, *Proc. Natl. Acad. Sci. USA* 2017, 114, 13483) They found that another six relatives of this fly do not have this capability and attributed this to the presence of relatively dense *setae* (tiny hairs) compared to other flies and presence cuticular hydrocarbons. Densely packed nanostructured surface as well as chemical similarities exist between fullerenes and hydrocarbons; both crystallize with van der Waals bond and are non-polar in nature, these factors enhance waterproofing.

The inventors show that nano-fullerite films stay dry underwater by forming highly stable plastron when submerged, remaining stable even when submerged in sodium carbonate ($Na_2CO_3$) rich solution with pH 10, mimicking the behavior of the alkali fly in the water of Mono Lake. The photograph presented in FIG. 22H shows a black acrylite substrate dipped in water. Its surface masked with a honey-bee stencil is coated using the colloidal gel. When viewed from certain glancing angles a rotated plastron effect is observed. The substrate was tested over a 3-month period, and the plastron was sustained without any degradation. To further show the applicability of gels the inventors deposited them on a deceased cockroach that has a greasy surface (FIG. 26). When dipped in water where the deposit was thin comes off due to expansion of cockroach body parts however, the plastron can be seen where the deposit is sustained, FIG. 22I. These demonstrations show the applicability and ease of which a non-wettable coating can be applied simply by depositing few drops of gels for their potential use in underwater application that includes anti-biofouling, anti-corrosion, or to reduce frictional drag. Close inspection of plastron reveals that it is present either in the form of very thin layer of air or hemi-wicking blisters depending on the surface morphology underneath. Regardless, it completely covers random deposits or films protecting them underwater. It is possible to inject or trap additional air bubbles into plastron that can remain stored underwater in the form of large blister (volume ≈0.25 cm3), FIG. 22I. The stored air can be replenished repeatedly with the films retaining their thin plastron layer. The inventors emphasize that aqueous media applications of these surfaces are more attractive as they are superaerophilic underwater. For example, these surfaces can be used to capture undesired bubbles in a microfluidic channel or bubble capture during a leak of flammable gas. Furthermore, fullerenes are known to inactivate enveloped viruses in biological aqueous systems. (F. Käsermann, C. Kempf, *Rev. Med. Virol.* 1998, 8, 143).

In the presence of visible light and oxygen, fullerenes instantaneously get photosensitized generating extremely high yields of singlet oxygen ($^1O_2$). This form of oxygen is highly cytotoxic, which can destroy proteins and DNA and is a well-established methodology for killing cancer cells referred to as photodynamic therapy. In such superhydrophobic photosensitizer applications, the amount of oxygen present in fullerites measured by XPS is highly beneficial. The inventors further tested plastron stability at a water depth of 2 feet, with the film displaying plastron up to a maximum of 3 h (FIG. 27). The plastron then decays slowly over time with films appearing greyish in color, which may occur due to dissolution of trapped air in water. However, plastron can be regenerated in situ simply by injection of air onto the submerged films.

Finally, the inventors demonstrate that colloidal gels can be scaled to create large-area surface coatings. FIG. 22K-L shows large-area superhydrophobic surface created by drop casting gel and scaling them as paste using a glass pipette. To test the chemical stability of these surfaces, we used acidic (pH 4), neutral (pH 7), and alkaline (pH 10) droplets, FIG. 22K. As seen in FIG. 22L the surface can also sustain multiple droplets. Both acidic and alkaline solutions were found to erode the coatings if a droplet slips to edges of coating, FIG. 22L. The coatings adhere particularly well when they are deposited on glass, however they also adhere well on a silicon surface. Mechanical stability and durability of all superhydrophobic coatings have been a major concern since all surfaces are susceptible to abrasion when used for real world applications. To circumvent this issue, a new design strategy was reported very recently which is receiving significant attention. (D. Wang, Q. Sun, M. J. Hokkanen, C. Zhang, F.-Y. Lin, Q. Liu, S.-P. Zhu, T. Zhou, Q. Chang, B. He, Q. Zhou, L. Chen, Z. Wang, R. H. A. Ras, X. Deng, *Nature* 2020, 582, 55). It involves the use of an armored microstructure that contains pockets that can be filled with water repellent fragile nanostructures. These surfaces were demonstrated by incorporating fluorinated nanoclusters of silica and the resulting surfaces were found to preserve superhydrophobicity even following repeated abrasion from a sharp steel blade. Gelled nanofullerite clusters are well suited for such microstructures that can house them to provide extreme robustness.

CONCLUSION

In conclusion, the inventors discovered a simple method to produce solution-cast fullerite films using colloidal gels. Gelation is achieved via nanocrystallization of fullerenes, subsequent enrichment, and aging. The inventors found that films prepared using gels create a superhydrophobic surface, despite the high surface energy of these materials. However, surfaces resulting from assembly of freshly prepared nano-fullerites and their smooth films both were found to be hydrophilic. Superhydrophobic surface developed on inherently hydrophilic metals using femtosecond laser irradiation are well-known. (A.-M. Kietzig, S. G. Hatzikiriakos, P. Englezos, *Langmuir* 2009, 25, 4821; A.-M. Kietzig, M. N. Mirvakili, S. Kamal, P. Englezos, S. G. Hatzikiriakos, *J. Adhes. Sci. Technol.* 2011, 25, 2789; E. Bormashenko, T. Stein, G. Whyman, Y. Bormashenko, R. Pogreb, *Langmuir* 2006, 22, 9982) The randomness of non-wetting surface roughness is characterized via the self-affine fractal models and was distinguishable from the wettable surface using the PSD plots. The inventors have performed several experiments describing the water droplet behavior on these surfaces, demonstrated scalability of gels for large-area coatings and their chemical stability toward acidic and alkaline solutions. Furthermore, the inventors showed that these films are non-wettable, they stay dry even when submerged two feet underwater by forming highly stable plastron that can be used for capturing and storing gases underwater. The use of plastrons and superhydrophobic surfaces has so far been limited for water repellency applications since they are usually developed using inorganic materials or metals with a hydrophobic topping that does not possess additional functional properties like the fullerene materials.

The inventors anticipate these fullerite films coupled with their nonwetting properties can be exploited in many experiments and applications which were previously not possible as both $C_{60}$ and $C_{70}$ are highly reactive species of carbon; well known for their use in water splitting electrocatalysis, bacterial disinfection, hydrogen generation, as an electron acceptor, and antioxidant along with their high electrochemical stability.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A method of producing a superhydrophobic fullerite film having a superhydrophobic surface, the method comprising:
    growing nanofullerites using a sonication coupled crystallization procedure;
    aging the nano-fullerites for at least three weeks to form a colloidal gel; and
    depositing the colloidal gel onto a substrate by drop-casting to form the superhydrophobic fullerite film wherein the method is performed in the absence of any fluorination or silane surface treatment.

2. The method of claim 1, wherein the sonication coupled crystallization procedure comprises the steps of:
    dissolving an amount of a fullerene powder in a solvent to form a solution;
    sonicating the solution with an antisolvent to induce crystallization;
    washing the solution with fresh antisolvent to form a suspension;
    centrifuging the suspension; and
    separating supernatant from the suspension to leave a pellet of nano-fullerites.

3. The method of claim 2, wherein the solvent is an organic solvent of fullerenes.

4. The method of claim 3, wherein the solvent is selected from the group consisting of carbon disulfide, toluene, xylenes, and dichlorobenzene.

5. The method of claim 2, wherein the antisolvent is an alcohol.

6. The method of claim 5, wherein the alcohol is selected from the group consisting of isopropyl alcohol, methanol, and butanol.

7. A method of producing a superhydrophobic fullerite large area coating comprising:
    growing nano-fullerites using a sonication coupled crystallization procedure;
    aging the nano-fullerites for at least three weeks to form a colloidal gel;
    depositing the colloidal gel onto a substrate by drop-casting; and
    scaling the colloidal gel into a paste to form the superhydrophobic fullerite large area coating;
    wherein the method is performed in the absence of any fluorination or silane surface treatment.

8. The method of claim 7, wherein the sonication coupled crystallization procedure comprises the steps of:
    dissolving an amount of a fullerene powder in a solvent to form a solution;
    sonicating the solution with an antisolvent to induce crystallization;
    washing the solution with fresh antisolvent to form a suspension;
    centrifuging the suspension; and
    decanting supernatant from the suspension leaving a pellet of nano-fullerites.

9. The method of claim 8, wherein the solvent is selected from the group consisting of carbon disulfide, toluene, xylenes, and dichlorobenzene.

10. The method of claim 8, wherein the antisolvent is an alcohol.

11. The method of claim 10, wherein the alcohol is selected from the group consisting of isopropyl alcohol, methanol, and butanol.

\* \* \* \* \*